(12) United States Patent
Harada et al.

(10) Patent No.: US 11,088,584 B2
(45) Date of Patent: Aug. 10, 2021

(54) MOTOR AND PUMP DEVICE

(71) Applicant: NIDEC SANKYO CORPORATION, Nagano (JP)

(72) Inventors: Masaki Harada, Nagano (JP); Hiroki Kuratani, Nagano (JP); Takashi Yamamoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 464 days.

(21) Appl. No.: 16/043,175

(22) Filed: Jul. 24, 2018

(65) Prior Publication Data

US 2019/0036412 A1    Jan. 31, 2019

(30) Foreign Application Priority Data

Jul. 25, 2017    (JP) .............................. JP2017-143466

(51) Int. Cl.
*H02K 5/10* (2006.01)
*H02K 3/50* (2006.01)
(Continued)

(52) U.S. Cl.
CPC ............. *H02K 3/522* (2013.01); *F04D 13/06* (2013.01); *F04D 13/0693* (2013.01);
(Continued)

(58) Field of Classification Search
CPC .... F04D 29/628; F04D 13/0693; F04D 13/06; H02K 5/10; H02K 1/146; H02K 2203/06;
(Continued)

(56) References Cited

U.S. PATENT DOCUMENTS

| 6,170,275 B1* | 1/2001 | Ueno | ..................... F04D 29/541 |
| | | | 416/174 |
| 2004/0051411 A1* | 3/2004 | Toya | ..................... B60T 8/4022 |
| | | | 310/89 |

(Continued)

FOREIGN PATENT DOCUMENTS

| CN | 104079103 | 10/2014 |
| CN | 104079105 | 10/2014 |

(Continued)

OTHER PUBLICATIONS

"Office Action of China Counterpart Application," with English translation thereof, dated Dec. 23, 2019, p. 1-p. 10.

*Primary Examiner* — Tulsidas C Patel
(74) *Attorney, Agent, or Firm* — JCIPRNET

(57) ABSTRACT

A motor includes a rotor, a stator having coils, a connector for supplying electrical power to the coils, and a resin sealing member. The resin sealing member comprises an opposite-to-output side sealing part and a connector sealing part covering the connector. The connector comprises a frame part into which the cable side connector is to be inserted, and the opposite-to-output side sealing part comprises a first protruded part and a second protruded part. A tip end face of the first protruded part and a tip end face of the second protruded part are located on one imaginary face intersecting the rotation center line, a tip end on the opposite-to-output side of the frame part is located on the output side with respect to the imaginary face, and the second protruded part is provided at a position closer to the frame part between the first protruded part and the frame part.

22 Claims, 13 Drawing Sheets

(51) Int. Cl.

| | |
|---|---|
| *H02K 3/44* | (2006.01) |
| *H02K 3/52* | (2006.01) |
| *F04D 29/62* | (2006.01) |
| *F04D 13/06* | (2006.01) |
| *H02K 1/27* | (2006.01) |
| *H02K 5/22* | (2006.01) |
| *H02K 7/08* | (2006.01) |
| *H02K 7/14* | (2006.01) |
| *H02K 5/167* | (2006.01) |
| *H02K 1/18* | (2006.01) |
| *H02K 1/14* | (2006.01) |
| *H02K 15/12* | (2006.01) |

(52) U.S. Cl.
CPC ............ *F04D 29/628* (2013.01); *H02K 1/185* (2013.01); *H02K 1/2753* (2013.01); *H02K 3/44* (2013.01); *H02K 5/10* (2013.01); *H02K 5/1672* (2013.01); *H02K 5/225* (2013.01); *H02K 7/083* (2013.01); *H02K 7/14* (2013.01); *H02K 1/146* (2013.01); *H02K 15/12* (2013.01); *H02K 2203/06* (2013.01); *H02K 2213/03* (2013.01)

(58) Field of Classification Search
CPC .......... H02K 3/522; H02K 3/44; H02K 1/185; H02K 7/083; H02K 5/225; H02K 15/12; H02K 2213/03
See application file for complete search history.

(56) References Cited

U.S. PATENT DOCUMENTS

| | | |
|---|---|---|
| 2010/0237721 A1 | 9/2010 | Ishizue et al. |
| 2015/0159656 A1* | 6/2015 | Urabe ................. F24D 11/0214 165/104.31 |
| 2015/0302963 A1* | 10/2015 | Arai ....................... H02K 15/12 335/299 |

FOREIGN PATENT DOCUMENTS

| | | |
|---|---|---|
| CN | 204025090 | 12/2014 |
| CN | 204967505 | 1/2016 |
| CN | 106864581 | 6/2017 |
| JP | 2016003580 | 1/2016 |
| JP | 2016181951 | 10/2016 |
| KR | 20160139290 | 12/2016 |

\* cited by examiner

MOTOR AND PUMP DEVICE

CROSS REFERENCE TO RELATED APPLICATION

The present invention claims priority under 35 U.S.C. § 119 to Japanese Application No. 2017-143466 filed Jul. 25, 2017, the entire content of which is incorporated herein by reference.

TECHNICAL FIELD

The present invention relates to a motor including a connector with which an external cable is to be connected. Further, the present invention relates to a pump device structured to drive an impeller by the motor.

BACKGROUND

A pump device structured to rotate an impeller disposed in a pump chamber by a motor is described in Patent Literature 1 (Japanese Patent Laid-Open No. 2016-3580). In the pump device disclosed in the Patent Literature, the motor includes a rotor which is connected with the impeller, a stator disposed on an outer peripheral side with respect to the rotor, a partition member which separates the rotor from the stator, and a resin sealing member which covers the stator on an outer peripheral side of the partition member. A magnet is held by the rotor and coils are held by the stator. The resin sealing member protects the coils from water or the like flowing through the pump chamber.

Further, the motor includes a connector with which a cable side connector of an external cable is connected for supplying electrical power to the coils. The connector is provided on an opposite-to-output side of the stator so as to be separated from a pump chamber. A cable is attached to the connector from an outer peripheral side. The connector is covered by the resin sealing member except a joining part with the cable. The joining part of the connector is projected to an outer peripheral side from the resin sealing member.

It may be required that an external cable is connected with the connector from the opposite-to-output side of a motor. In this case, the connector is required to be arranged in a posture that its connecting part is directed to the opposite-to-output side.

The connecting part is required to be exposed from the resin sealing member and thus, when the connector is disposed in a posture that the connecting part is directed to the opposite-to-output side, an end portion on the opposite-to-output side of the connector is projected from an end face on the opposite-to-output side of the resin sealing member. Therefore, in a case that the motor is to be mounted on an apparatus or the like, when the motor is placed on a workbench in a state that the opposite-to-output side is disposed on the lower side, a tip end of the connecting part of the connector may be contacted with a placing surface of the workbench and the connector may be damaged.

SUMMARY

In view of the problem described above, the present invention provides a motor whose connector is not contacted with a placing surface when the motor is placed on the placing surface in a posture that the opposite-to-output side is disposed on the lower side. Further, the present invention provides a pump device structured to drive an impeller by the motor.

The present invention provides a motor including a rotor, a stator having a plurality of coils which are arranged in a ring shape and surround the rotor, a connector which is located on an outer peripheral side with respect to the plurality of the coils and is capable of being detachably connected with a cable side connector of an external cable for supplying electrical power to the plurality of the coils, and a resin sealing member which covers the coils. When one side in a direction of a rotation center line of the rotor is referred to as an output side, and an other side is referred to as an opposite-to-output side, the resin sealing member is provided with an opposite-to-output side sealing part which is disposed on the opposite-to-output side with respect to the rotor and the stator, and a connector sealing part which covers the connector from the output side. The connector is provided with a frame part into which the cable side connector is to be inserted from the opposite-to-output side, and an end portion on the opposite-to-output side of the frame part is exposed to the opposite-to-output side from the resin sealing member. The opposite-to-output side sealing part is provided with a first protruded part and a second protruded part which are protruded to the opposite-to-output side, a tip end face of the first protruded part and a tip end face of the second protruded part are located on one imaginary face intersecting the rotation center line, and a tip end on the opposite-to-output side of the frame part is located on the output side with respect to the imaginary face. The second protruded part is provided at a position closer to the frame part between the first protruded part and the frame part.

According to the present invention, the opposite-to-output side sealing part of the resin sealing member which is located on the opposite-to-output side with respect to the rotor and the stator is provided with two protruded parts located on the opposite-to-output side, and the tip end faces of the two protruded parts are located on the same imaginary face. Further, in the connector into which a cable side connector of an external cable is to be inserted, an end on the opposite-to-output side of the frame part (connecting part) which is exposed from the resin sealing member is located on the output side with respect to the imaginary face including the tip end faces of the two protruded parts. Therefore, in a case that the motor is placed on a placing surface of a workbench in a posture that its opposite-to-output side is disposed on the lower side, the motor stands on its own in a posture that the tip end faces of the two protruded parts are abutted with the placing surface (in a posture that the imaginary face and the placing surface are coincided with each other). Further, in this posture, the end on the opposite-to-output side of the frame part of the connector is not contacted with the placing surface. Therefore, the tip end of the connector is prevented from being damaged. Further, in the first protruded part and the second protruded part, the second protruded part is provided at a position close to the frame part of the connector and thus the end on the opposite-to-output side of the frame part can be surely prevented from being contacted with the placing surface. In addition, the motor stands on its own in a predetermined posture with the tip ends of the two protruded parts provided in the resin sealing member as a setting face. Therefore, for example, in comparison with a case that the entire surface on the opposite-to-output side of the opposite-to-output side sealing part of the resin sealing member is located on the opposite-to-output side with respect to the tip end of the frame part of the connector, an amount of resin for forming the resin sealing member can be reduced and a manufacturing cost of the device can be restrained.

In the present invention, it is preferable that the motor includes a bearing member which rotatably supports the rotor, the opposite-to-output side sealing part is provided with a bearing member holding part which holds the bearing member, and the first protruded part is provided at a position overlapping with the bearing member holding part when viewed in the direction of the rotation center line. The temperature of the bearing member may rise due to heat generated by slidably contacting with the rotating rotor. In this case, when the first protruded part is provided at a position overlapping with the bearing member holding part in the opposite-to-output side sealing part of the resin sealing member, a surface area of a portion of the opposite-to-output side sealing part close to the bearing member holding part is increased by forming the first protruded part. Therefore, heat generated by slidably contacting of the bearing member with the rotor can be radiated to the outside through the opposite-to-output side sealing part.

In the present invention, it is preferable that the connector includes a plurality of terminal pins which are electrically connected with the plurality of the coils, each of the terminal pins is provided with an external connection part which is extended on an inner side of the frame part along the frame part, a connecting part which is extended from an end on the output side of the external connection part to a side of the stator, and a coil wire connecting part which is extended from an end of the connecting part on the side of the stator between the frame part and the stator. The coil wire connecting part is provided with a straight part which is extended in a straight shape from the connecting part to the opposite-to-output side and is reached to the opposite-to-output side of the stator, and a bending part which is bent from the straight part to the side of the stator, and the second protruded part is provided at a position overlapping with a tip end of the bending part when viewed in the direction of the rotation center line. According to this structure, the opposite-to-output side sealing part is provided with a portion whose thickness is larger than other portions on the opposite-to-output side of the bending part of the coil wire connecting part by forming of the second protruded part. Therefore, the coil wire connecting parts of the terminal pins can be protected.

In the present invention, it is preferable that the stator includes a stator core having a ring-shaped part and a plurality of salient pole parts which are protruded from the ring-shaped part to an inner side in a radial direction, each of the coils is wound around each of the salient pole parts through an insulator, the connector is provided with a connector housing having the frame part, the insulator and the connector housing are structured of one integrally molded product made of resin, the plurality of the terminal pins is supported by the connector housing, and the connecting part is located at a position overlapping with the stator core when viewed in a direction perpendicular to the rotation center line. According to this structure, when the terminal pin is to be supported by the connector housing, even in a case that a force is applied to the connector housing in a direction inclined to the axial line and deformation may be occurred between the insulator and the connector housing which are an integrally molded product, the deformation is restrained because the connecting part of the terminal pin located on an outer peripheral side of the stator core functions as a support.

In the present invention, it is preferable that a length dimension in a circumferential direction of the second protruded part is longer than a length dimension in the circumferential direction of an opening of the frame part. According to this structure, in a case that the motor is placed on a placing surface of a workbench, or the like, the end on the opposite-to-output side of the frame part can be surely prevented from contacting with the placing surface. Specifically, it may be structured that the opposite-to-output side sealing part is provided with a ring-shaped protruded part which is protruded to the opposite-to-output side on an outer peripheral side of the first protruded part so as to surround the first protruded part, a flat end face whose circumferential direction is long is formed as the tip end face of the second protruded part on an inner peripheral side with respect to the connector sealing part in an outer peripheral edge portion of the ring-shaped protruded part, and a length dimension in a circumferential direction of the flat end face is set longer than a length dimension in the circumferential direction of an opening of the frame part. In this case, it may be structured that the connector sealing part is provided so as to surround an outer peripheral face of the frame part and expose a portion of the frame part on the opposite-to-output side, the frame part is provided with a rectangular outline shape whose longitudinal direction is directed in the circumferential direction when viewed in the direction of the rotation center line, and the flat end face of the second protruded part is a rectangular end face whose longitudinal direction is directed in the circumferential direction when viewed in the direction of the rotation center line.

In the present invention, it is preferable that the first protruded part is protruded from a center portion of the opposite-to-output side sealing part and is a protruded part in a circular cylinder shape which is structured with the bearing member holding part in its inside, and a tip end face of the first protruded part is a circular end face which is formed on the opposite-to-output side of the protruded part in the circular cylinder shape. Further, it is preferable that the opposite-to-output side sealing part is provided with a ring-shaped protruded part which is protruded to the opposite-to-output side on an outer peripheral side of the first protruded part so as to surround the first protruded part, and a flat end face whose circumferential direction is long is formed as the tip end face of the second protruded part on an inner peripheral side with respect to the connector sealing part in an outer peripheral edge portion of the ring-shaped protruded part. According to this structure, in a case that the motor is placed on a placing surface of a workbench in a posture that its opposite-to-output side is disposed on the lower side, the motor can be supported in a stable state by the circular end face and the flat end face long in the circumferential direction which are the tip end faces of the two protruded parts.

Further, the present invention provides a pump device including the above-mentioned motor, a pump chamber, an impeller which is disposed in an inside of the pump chamber. The rotor includes an output shaft which is coaxial with the rotation center line, the output shaft is extended into an inside of the pump chamber from an outside of the pump chamber, and the impeller is connected with an end portion on the output side of the output shaft.

According to the present invention, in a case that the pump device is placed on a placing surface of a workbench or the like in a posture that the opposite-to-output side of the motor is disposed on the lower side, the pump device stands on its own in a posture that the tip end faces of the two protruded parts of the resin sealing member of the motor are abutted with the placing surface. Further, in this posture, the end on the opposite-to-output side of the connector is not contacted with the placing surface. Therefore, the tip end of the connector is prevented from being damaged. Further, the end portion on the opposite-to-output side of the frame part of the connector with which a cable side connector of an external cable is to be connected is exposed to the opposite-to-output side from the resin sealing member. In other words, an exposed portion of the frame part from the resin sealing member is provided at a separated position from the pump chamber and the impeller. Therefore, the frame part of the connector with which a cable side connector of an external cable is to be connected can be protected from water or the like pumped by the impeller.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of a pump device and a motor to which the present invention is applied will be described below with reference to the accompanying drawings.

(Pump Device)

Figure 1:
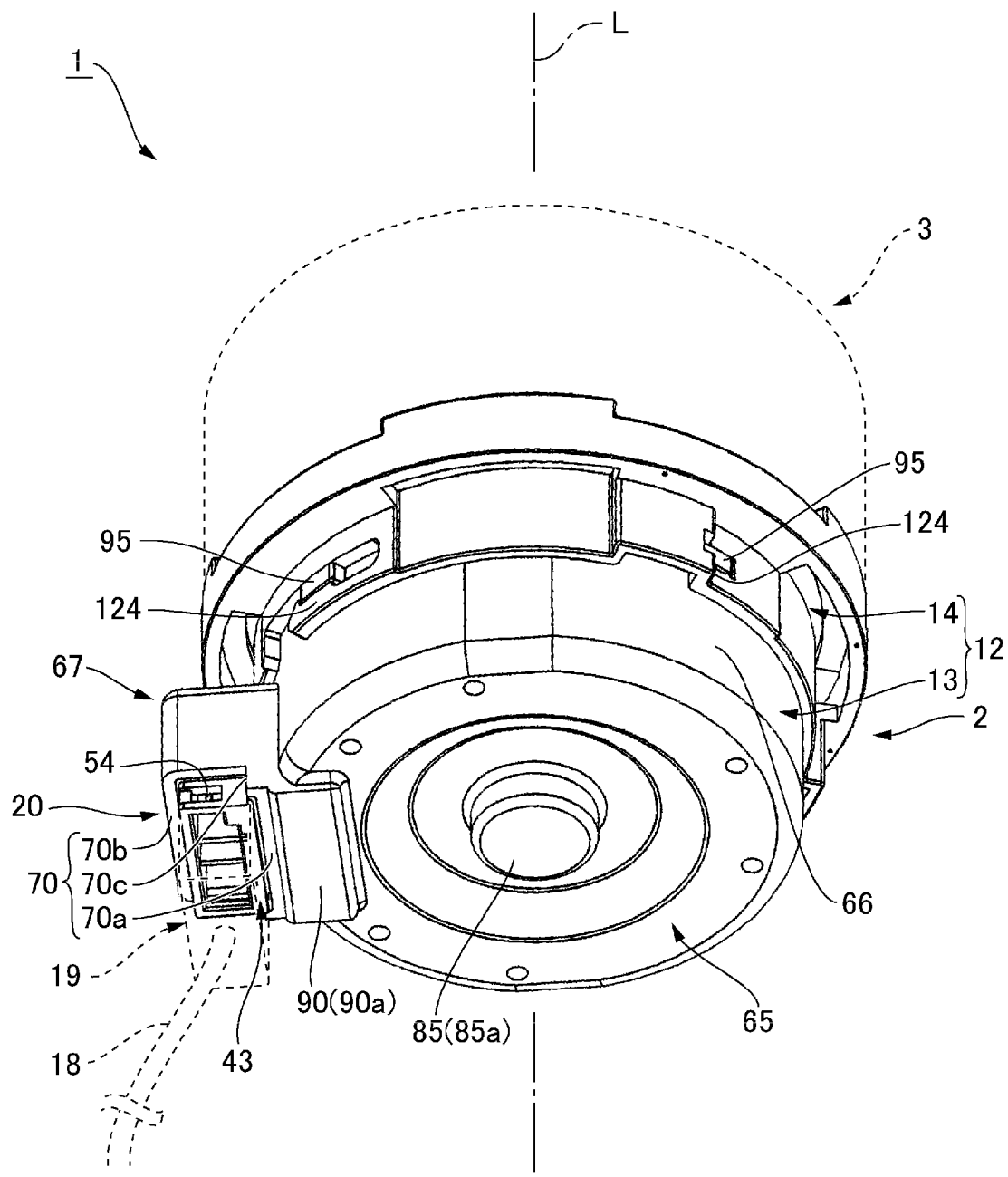
FIG. 1 is a perspective outward appearance view showing a pump device to which the present invention is applied.
Figure 2:
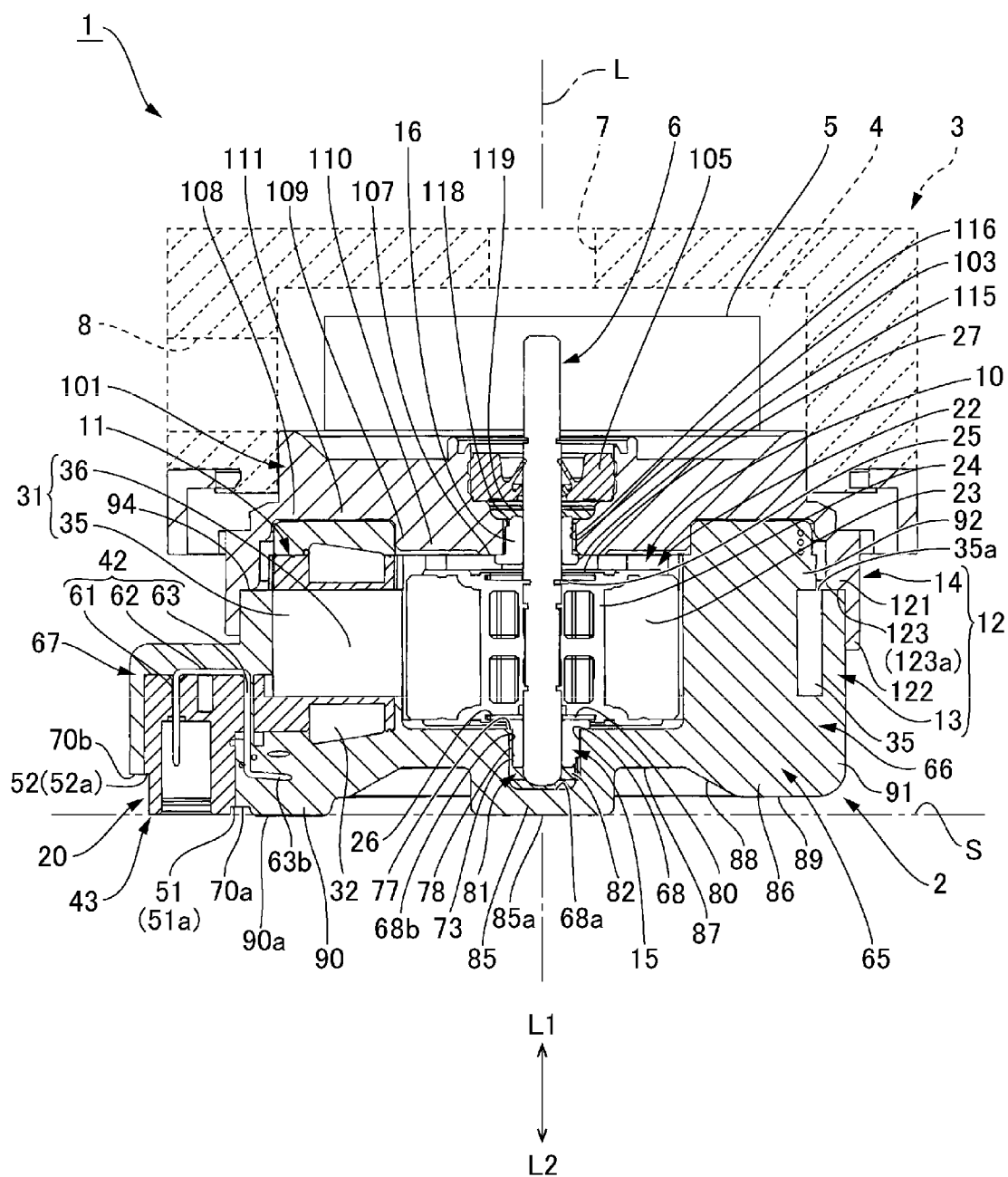
FIG. 2 is a cross-sectional view showing a pump device.
Figure 3:
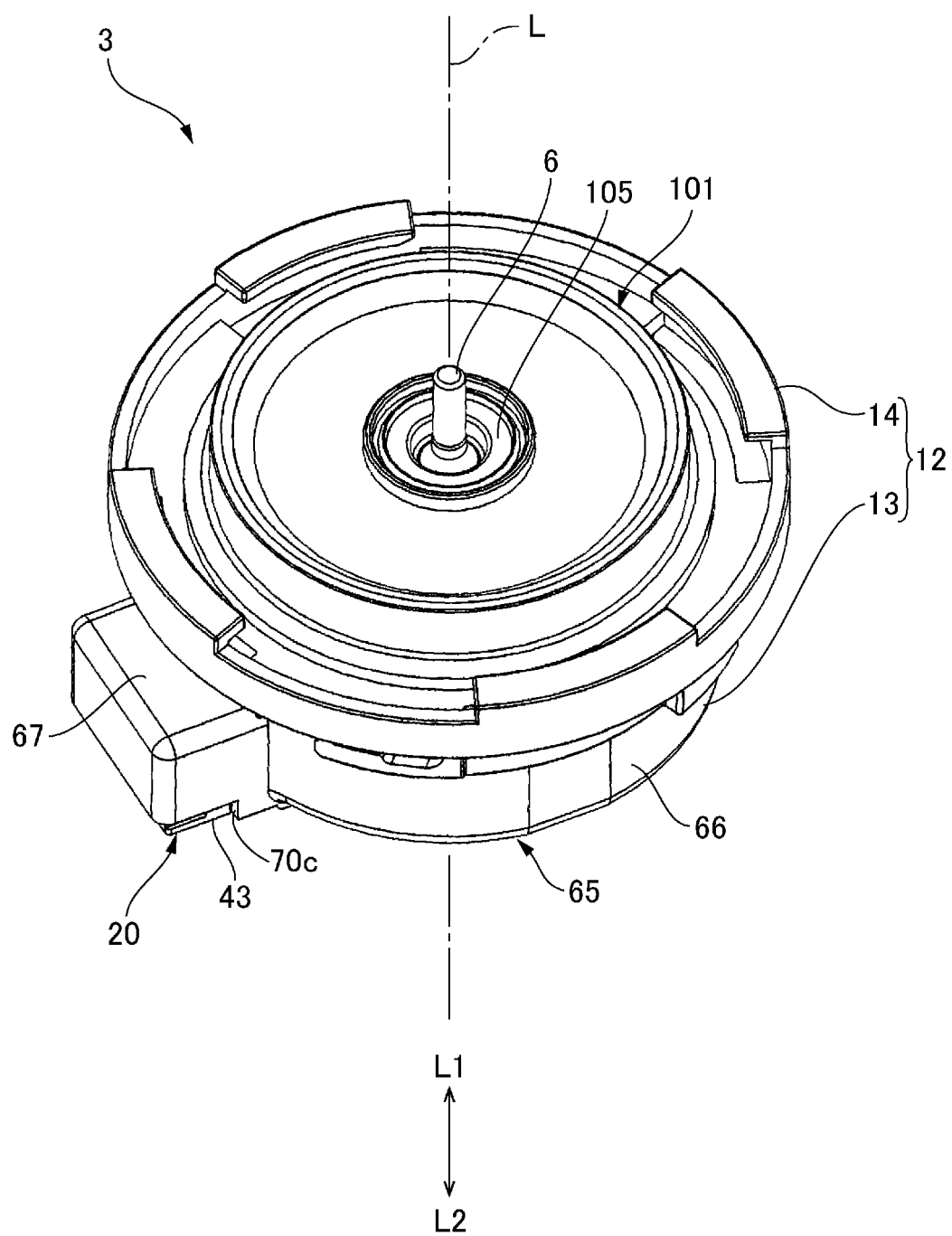
FIG. 3 is a perspective view showing a motor which is viewed from an output side.
Figure 4:
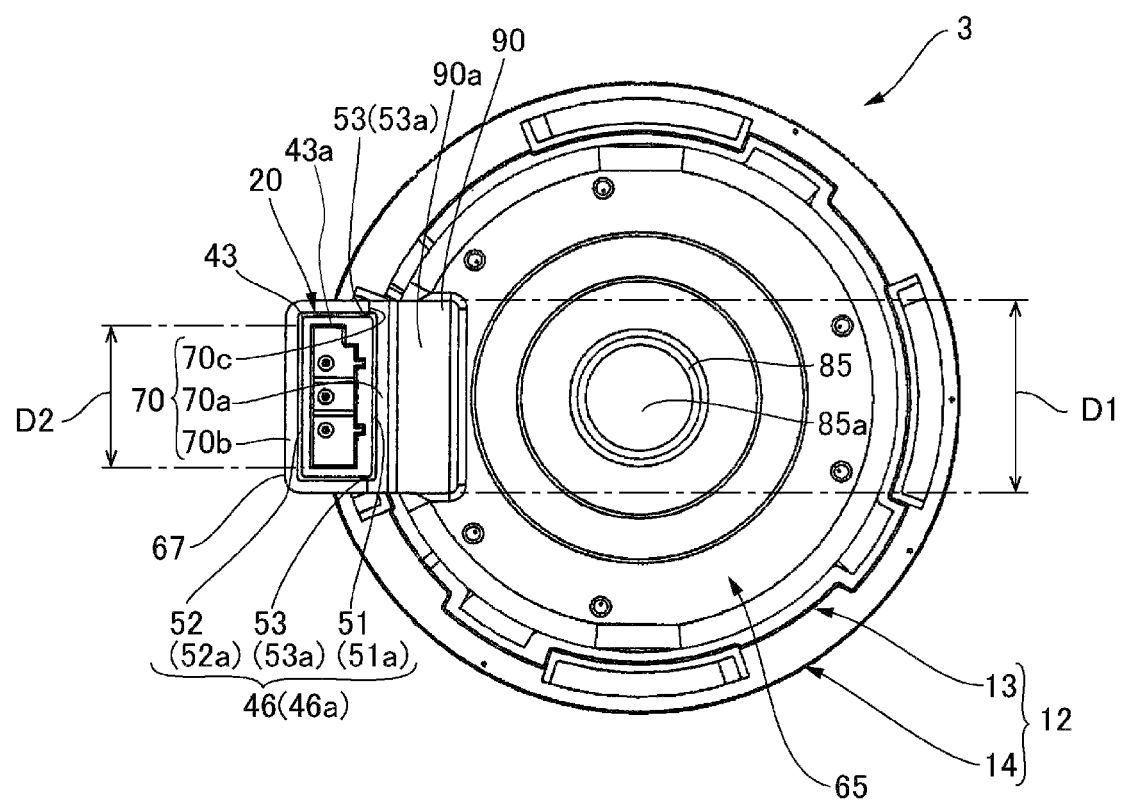
FIG. 4 is a bottom view showing a motor which is viewed from an opposite-to-output side.

FIG. 1 is a perspective outward appearance view showing a pump device to which the present invention is applied. FIG. 2 is a cross-sectional view showing a pump device. FIG. 3 is a perspective view showing a motor which is viewed from a side where an output shaft is protruded. FIG. 4 is a bottom view showing a motor. In FIGS. 1 and 2, a case body is represented by a dotted line.

As shown in FIG. 1, a pump device 1 includes a motor 2 and a case body 3 which is attached to the motor 2. As shown in FIG. 2, a pump chamber 4 is sectioned between the motor 2 and the case body 3. An impeller 5 is disposed in an inside of the pump chamber 4. The impeller 5 is attached to a shaft end portion of an output shaft 6 of the motor 2 which is extended into the pump chamber 4 from the motor 2 side (outside of the pump chamber 4). The case body 3 is provided with an inlet port 7 and an outlet port 8 for a fluid. The inlet port 7 is provided at a position overlapping with an axial line "L" of the output shaft 6 of the motor 2. The outlet port 8 is provided in a direction perpendicular to the axial line "L". When the motor 2 is driven and the impeller 5 is rotated, fluid such as water taken through the inlet port 7 is discharged from the outlet port 8 through the pump chamber 4.

In the present specification, one side in the axial line "L" direction of the output shaft 6 of the motor 2 is referred to as an upper side "L1" and the other side is referred to as a lower side "L2" corresponding to an upper and lower direction in the drawing. The upper side "L1" is a side where the impeller 5 is attached to the output shaft 6 and is an output side of the motor 2. The lower side is an opposite-to-output side of the motor 2. Further, a direction perpendicular to the axial line "L" is a radial direction, and a direction around the axial line "L" is a circumferential direction. FIG. 1 is a perspective outward appearance view showing the pump device 1 which is viewed from the lower side "L2". The axial line "L" of the output shaft 6 is a rotation center line of the rotor 10 of the motor 2, and the axial line "L" direction is a rotation center line direction.

The motor 2 is a DC brushless motor. As shown in FIG. 2, the motor 2 includes a rotor 10 having the output shaft 6, a stator 11 disposed on an outer peripheral side with respect to the rotor 10, and a housing 12 which accommodates the rotor 10 and the stator 11. As shown in FIG. 3, the housing 12 includes a resin sealing member 13 which covers the stator 11 from the lower side "L2" and a cover member 14 which covers the resin sealing member 13 from the upper side "L1". The cover member 14 is fixed to the resin sealing member 13. As shown in FIG. 2, the resin sealing member 13 holds a first bearing member 15 which supports a shaft portion on the lower side "L2" of the output shaft 6 of the rotor 10 so as to be movable in the axial line "L" direction and rotatable around the axial line "L". The cover member 14 holds a second bearing member 16 which supports a middle portion of the output shaft 6 so as to be movable in the axial line "L" direction and rotatable around the axial line "L". The output shaft 6 of the rotor 10 penetrates through the cover member 14 from the lower side "L2" to the upper side "L1".

The cover member 14 is covered with the case body 3 from the upper side "L1". In this manner, the pump chamber 4 is sectioned between the cover member 14 and the case body 3, and the output shaft 6 is set in a state that the output shaft 6 is extended into the pump chamber 4 from the outside of the pump chamber 4. As shown in FIG. 1, a part of a connector 20 is exposed outside from a lower end portion of the resin sealing member 13. A cable side connector 19 of an external cable 18 for supplying electric power to the motor 2 is detachably connected with the connector 20 from the lower side "L2". In this case, a direction to the upper side "L1" from the lower side "L2" is an inserting direction in which the cable side connector 19 is inserted into the connector 20, and the upper side "L1" is a front side in the inserting direction and the lower side "L2" is a rear side in the inserting direction. Therefore, the connector 20 exposes its rear side end portion in the inserting direction of the cable side connector 19 outside from a lower end portion of the resin sealing member 13.

(Rotor)

Figure 5:
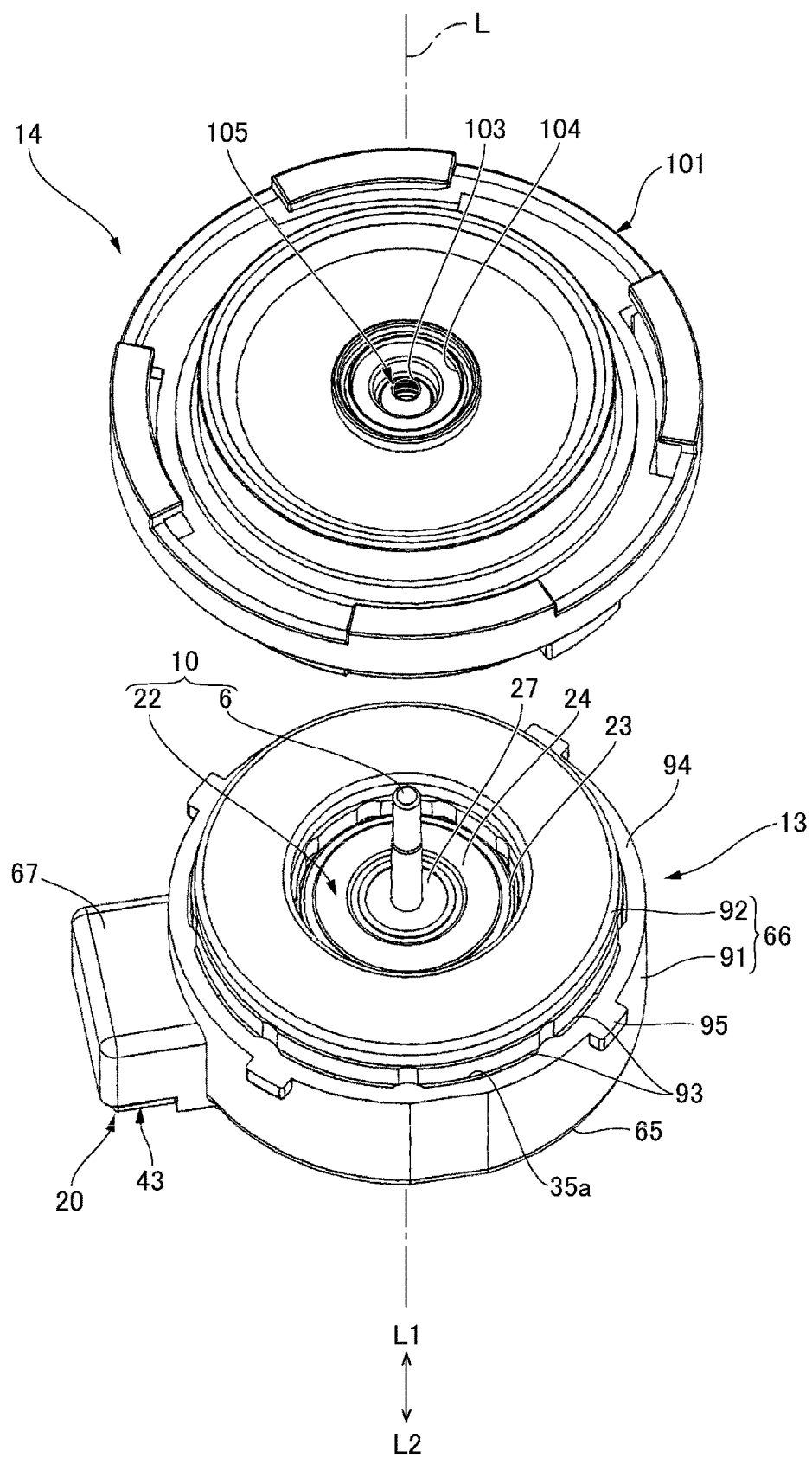
FIG. 5 is an exploded perspective view showing a motor which is viewed from an output side.
Figure 6:
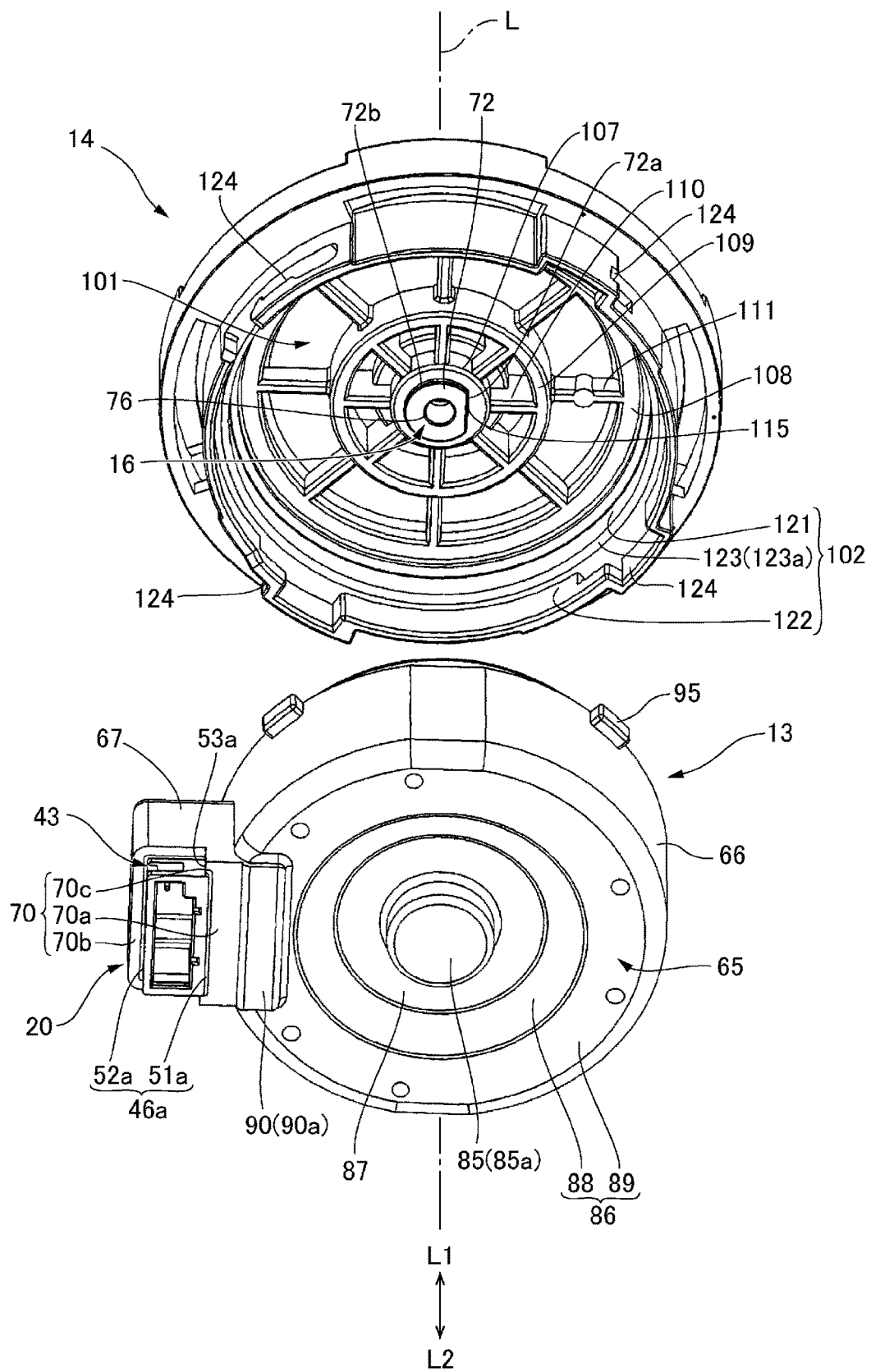
FIG. 6 is an exploded perspective view showing a motor which is viewed from an opposite-to-output side.
Figure 7:
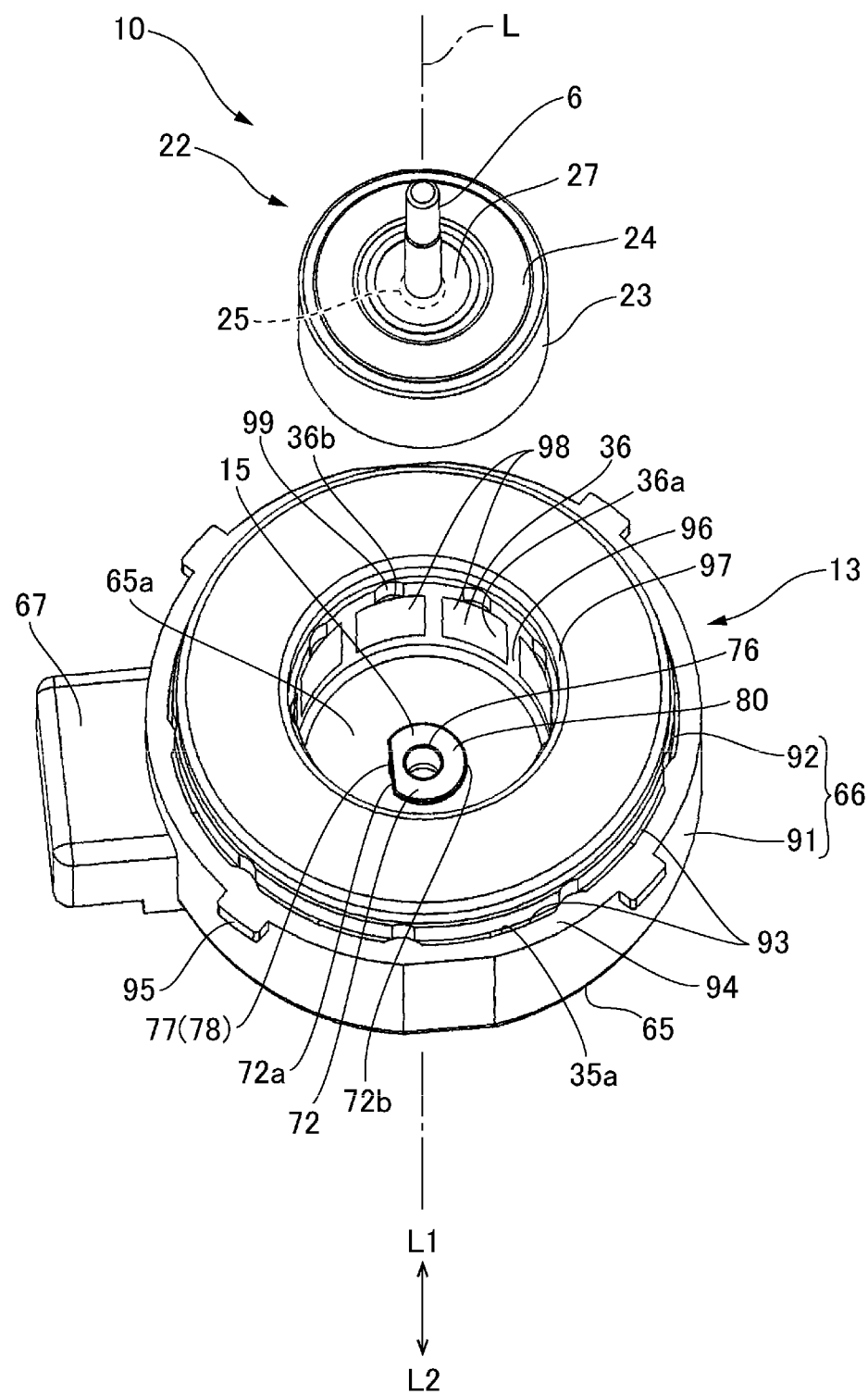
FIG. 7 is an exploded perspective view showing a motor from which a cover member is detached.
Figure 8:
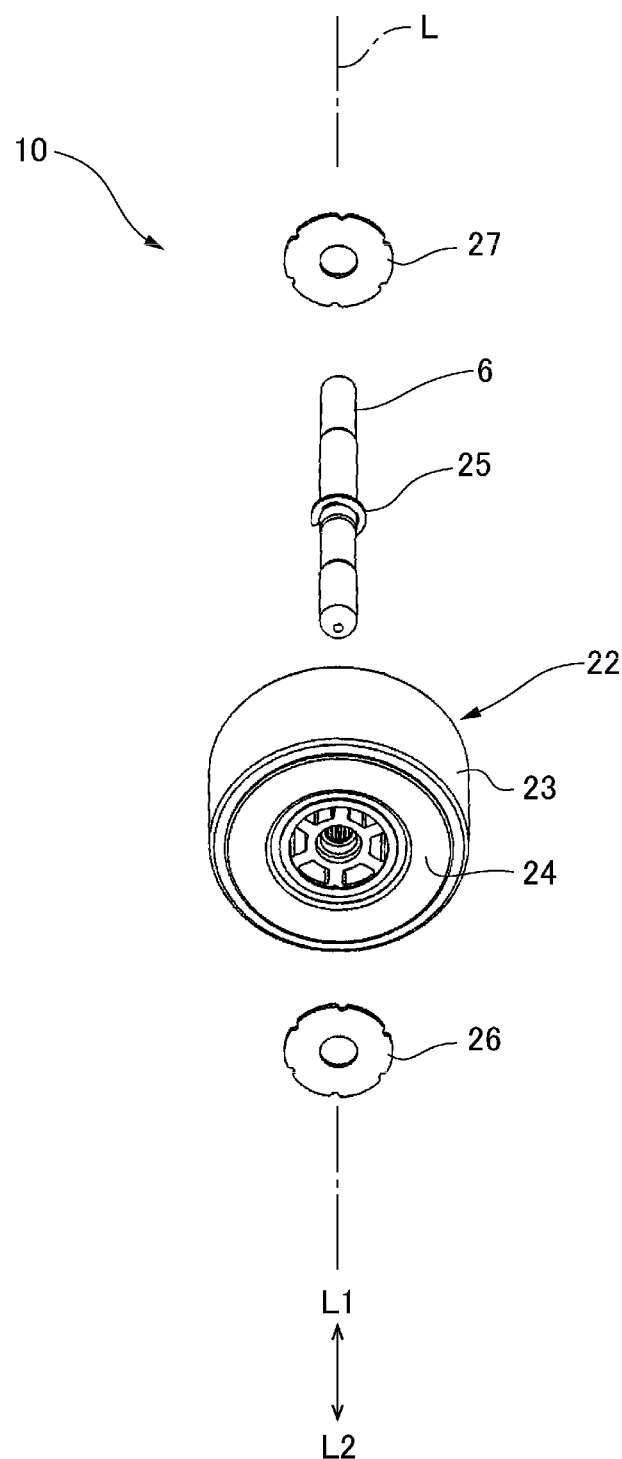
FIG. 8 is an exploded perspective view showing a rotor.

FIG. 5 is an exploded perspective view showing the motor 2 which is viewed from the upper side "L1". FIG. 6 is an exploded perspective view showing the motor 2 which is viewed from the lower side "L2". FIG. 7 is an exploded perspective view showing the motor 2 in a state that the cover member 14 is detached. FIG. 8 is an exploded perspective view showing the rotor 10.

As shown in FIG. 5, the rotor 10 includes the output shaft 6 and a rotor main body 22 which holds the output shaft 6 from the outer peripheral side. As shown in FIG. 7, the rotor main body 22 includes a ring-shaped magnet 23 surrounding the output shaft 6 and a holding member 24 which holds the output shaft 6 and the magnet 23. The magnet 23 is coaxially disposed with the output shaft 6 and an "N"-pole and an "S"-pole are alternately magnetized in a circumferential direction on its outer peripheral face. The output shaft 6 is made of stainless steel. As shown in FIG. 8, the output shaft 6 is formed with a ring-shaped groove near the center in the axial line "L" direction, and an "E"-ring 25 is fixed to the ring-shaped groove. The "E"-ring 25 is a metal plate-shaped member. The "E"-ring 25 is embedded and fixed to an upper end face of the holding member 24.

Further, the rotor main body 22 includes a first bearing plate 26 which is fixed to a lower end portion of the holding member 24 and a second bearing plate 27 which is fixed to an upper end portion of the holding member 24. Each of the first bearing plate 26 and the second bearing plate 27 is a metal plate formed in a substantially circular ring shape and, in this embodiment, the first bearing plate 26 and the second bearing plate 27 are metal washers. As shown in FIG. 2, the first bearing plate 26 covers a center portion in a radial direction of the holding member 24 from the lower side "L2" in a state that the output shaft 6 is penetrated through its center hole. The first bearing plate 26 is held by the holding member 24 in a posture perpendicular to the axial line "L". As shown in FIG. 7, the second bearing plate 27 covers the "E"-ring 25 and a center portion in the radial direction of the holding member 24 from the upper side "L" in a state that the output shaft 6 is penetrated through its center hole. As shown in FIG. 2, the second bearing plate 27 is in surface contact with the "E"-ring 25. The second bearing plate 27 is held by the holding member 24 in a posture perpendicular to the axial line "L".

(Stator)

Figure 9A:
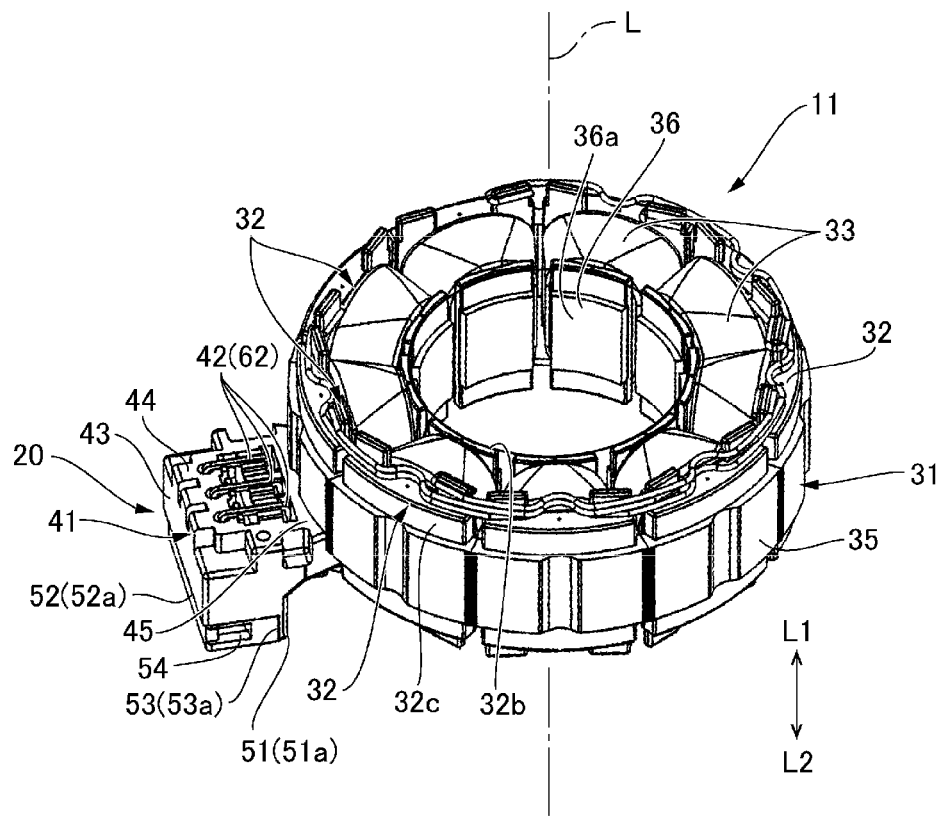
FIGS. 9A and 9B are a perspective view showing a stator and a plan view showing the stator viewed from an opposite-to-output side.
Figure 9B:
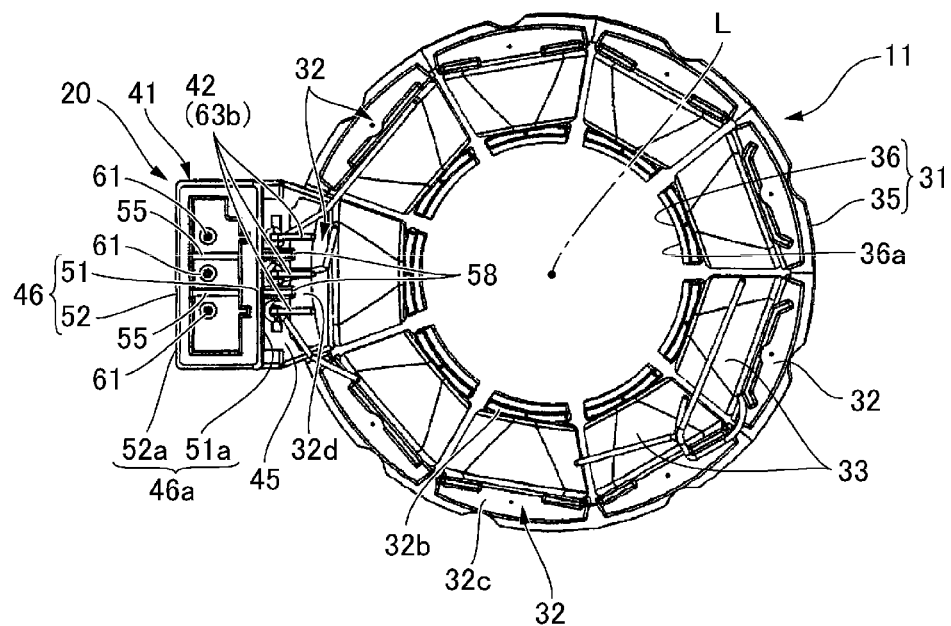
Figure 10A:
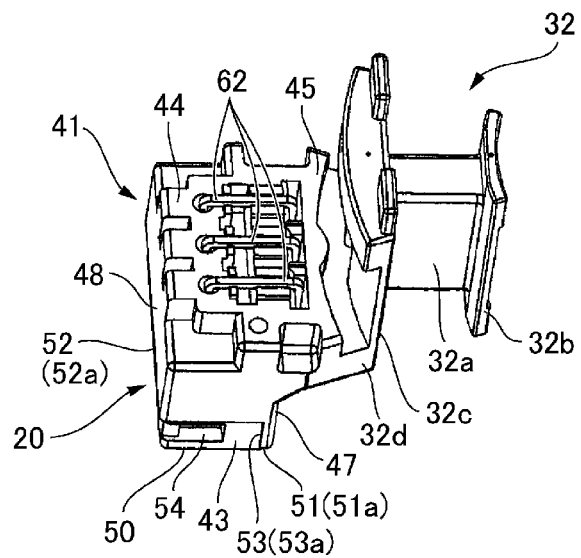
FIGS. 10A, 10B and 10C are perspective views and a cross-sectional view showing a connector and an insulator which are structured to be an integrally molded product.
Figure 10B:
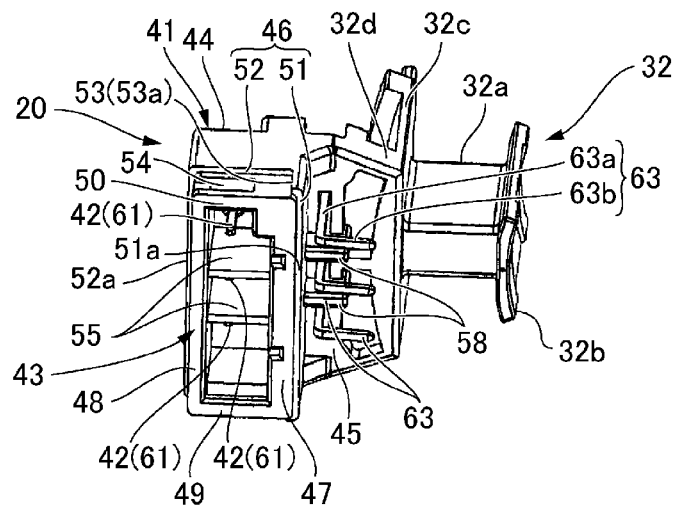
Figure 10C:
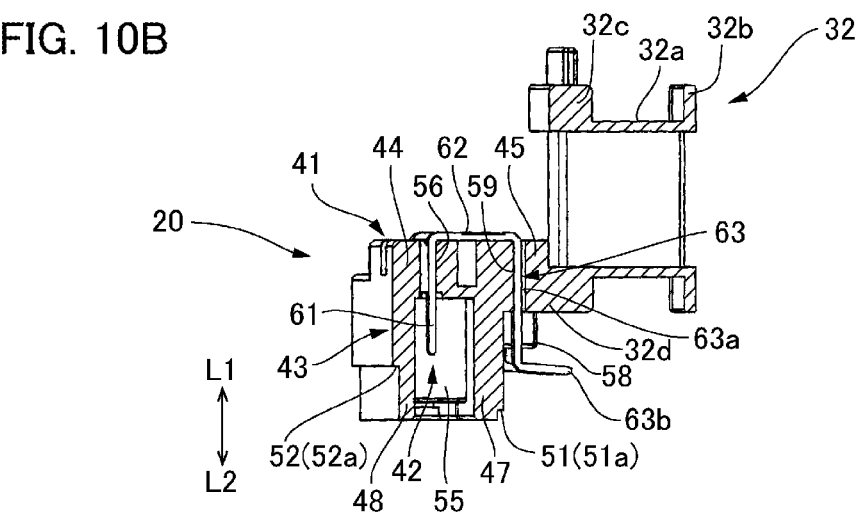

FIG. 9A is a perspective view showing the stator 11 and the connector 20 which are viewed from the upper side "L1" and FIG. 9B is a plan view showing the stator 11 and the connector 20 which are viewed from the lower side "L2". FIG. 10A is a perspective view showing the connector 20 and an insulator 32 integrated with the connector 20 which are viewed from the upper side "L1", FIG. 10B is a perspective view showing the connector 20 and the insulator 32 viewed from the lower side "L2", and FIG. 10C is a cross-sectional view showing the connector 20 and the insulator 32 integrated with the connector 20.

As shown in FIGS. 9A and 9B, the stator 11 includes a ring-shaped stator core 31 disposed on an outer peripheral side with respect to the rotor 10 and a plurality of coils 33 which are wound around the stator core 31 through insulators 32. The plurality of the coils 33 are arranged in a ring shape around the axial line "L" in a posture that their center holes are directed in a radial direction. The connector 20 is disposed on an outer peripheral side with respect to the coils 33 and the stator core 31.

The stator core 31 is a laminated core which is structured of thin magnetic plates made of magnetic material which are laminated. The stator core 31 is provided with a ring-shaped part 35 and a plurality of salient pole parts 36 which are protruded to an inner side in the radial direction from the ring-shaped part 35. The plurality of the salient pole parts 36 is formed at equal angular pitches and is disposed at a constant pitch in a circumferential direction. In this embodiment, the plurality of the salient pole parts 36 is formed at an angular pitch of 40° with the axial line "L" as a center. As a result, the stator core 31 is provided with nine salient pole parts 36. An inner peripheral side end face 36a of the salient pole part 36 is a circular arc face with the axial line "L" as a center and faces an outer peripheral face of the magnet 23 of the rotor 10 through a slight gap.

Each of the insulators 32 is made of resin and has an insulation property. Each of the insulators 32 is formed in a tube shape with flanges whose both ends in the radial direction are provided with flange parts, and the insulator 32 is attached to the salient pole part 36 so that an axial direction of the insulator 32 formed in a tube shape and the radial direction of the stator 11 are coincided with each other. In other words, each insulator 32 is, as shown in FIG. 10A, provided with a tube part 32a into which the salient pole part 36 is inserted, an inner peripheral side flange part 32b which is enlarged from an end portion on an inner peripheral side of the tube part 32a, and an outer peripheral side flange part 32c which is enlarged from an end portion on an outer peripheral side of the tube part 32a. As shown in FIGS. 9A and 9B, the outer peripheral side flange part 32c covers an upper face and an under face of the ring-shaped part 35 of the stator core 31 to a midway position in the radial direction.

As shown in FIGS. 10A, 10B and 10C, in the plurality of the insulators 32, the insulator 32 disposed on an inner side in the radial direction of the connector 20 is integrally formed with a connector housing 41 of the connector 20. In other words, the insulator 32 closest to the connector 20 and the connector housing 41 are structured as an integrally molded product made of resin. The insulator 32 integrally molded with the connector housing 41 is, as shown in FIG. 9B and FIGS. 10A, 10B and 10C, provided with a connecting part 32d which is extended from the outer peripheral side flange part 32c to an outer peripheral side along an under end face of the ring-shaped part 35 of the stator core 31 and is continuously connected with the connector 20.

Each of the plurality of the coils 33 is wound around each of the plurality of the salient pole parts 36 through the insulator 32. Each coil 33 in a wound state around the salient pole part 36 through the insulator 32 is respectively protruded to the upper side "L1" and the lower side "L2" toward an outer side in the radial direction (ring-shaped part 35 side).

The coil 33 is structured of a conducting wire (coil wire) made of aluminum alloy or copper alloy. In this embodiment, a conducting wire made of aluminum alloy covered with copper alloy is used. In this embodiment, the number of each of the salient pole parts 36, the insulators 32 and the coils 33 is 9. The motor 2 is a three-phase brushless motor, and three of nine coils 33 are "U"-phase coils, three of the remaining six coils 33 are "V"-phase coils, and remaining three coils are "W"-phase coils. The "U"-phase coil, the "V"-phase coil and the "W"-phase coil are arranged in this order in the circumferential direction. In accordance with an embodiment of the present invention, other arrangements may be adopted.

Three "U"-phase coils are formed so that one conducting wire is successively wound around three salient pole parts 36, three "V"-phase coils are formed so that one conducting wire is successively wound around three salient pole parts 36, and three "W"-phase coils are formed so that one conducting wire is successively wound around three salient pole parts 36. As shown in FIG. 9B, the three conducting wires which structure the "U"-phase coils and the "V"-phase coils and the "W"-phase coils are connected with terminal pins 42 of the connector 20.

(Connector)

The connector 20 includes the connector housing 41 which is integrally molded with the insulator 32 and three terminal pins 42 which are supported by the connector housing 41. As shown in FIGS. 9A and 9B, the connector housing 41 is disposed on an outer peripheral side with respect to the stator core 31.

As shown in FIG. 10C, the connector housing 41 is provided with a frame part 43 which is extended in the axial line "L" direction, a closing part 44 which closes an opening on the upper side "L1" of the frame part 43, and an extended part 45 which is extended toward the stator core 31 from the frame part 43 and the closing part 44. A male-type cable side connector 19 is detachably inserted into the frame part 43 from the lower side "L2". The connecting part 32d of the insulator 32 is continuously connected with the extended part 45 from an inner peripheral side.

As shown in FIG. 9B, an outline shape of the frame part 43 when viewed in the axial line "L" direction is a rectangular shape and its longitudinal direction is directed in the circumferential direction. The frame part 43 is provided with a step part 46 on its outer peripheral face so as to be enlarged to an outer peripheral side from a midway position in the axial line "L" direction from the lower side "L2" to the upper side "L1" (inserting direction of the cable side connector 19). A shape of the step part 46 is a ring shape when viewed from the lower side "L2" (when viewed from a rear side in the inserting direction). Specifically, as shown in FIG. 10B, the frame part 43 is provided with a first frame plate portion 47 and a second frame plate portion 48 which are extended in the circumferential direction and face each other in the radial direction, a third frame plate portion 49 which connects ends on one side in the circumferential direction of the first frame plate portion 47 and the second frame plate portion 48, and a fourth frame plate portion 50 which connects ends on the other side in the circumferential direction of the first frame plate portion 47 and the second frame plate portion 48. The step part 46 is provided with a first step part portion 51 provided on an outer peripheral face of the first frame plate portion 47 disposed on the inner peripheral side close to the axial line "L", and a second step part portion 52 which is provided on outer peripheral faces of the second frame plate portion 48, the third frame plate portion 49 and the fourth frame plate portion 50. The first step part portion 51 is provided with a first step part portion end face 51a facing the lower side "L2", and the second step part portion 52 is provided with a second step part portion end face 52a facing the lower side "L2". The first step part portion end face 51a and the second step part portion end face 52a are the faces which are respectively perpendicular to the axial line "L".

In this embodiment, the first step part portion 51 is located on the lower side "L2" with respect to the second step part portion 52. Therefore, the first step part portion end face 51a of the first step part portion 51 is located on the lower side "L2" with respect to the second step part portion end face 52a of the second step part portion 52. However, as shown in FIG. 9B, when the frame part 43 is viewed in the axial line "L" direction, the first step part portion end face 51a and the second step part portion end face 52a structure a step part end face 46a in a ring shape. In this embodiment, as shown in FIG. 10A, an outer peripheral face of the second frame plate portion 48 is formed with a connection step part 53 which is extended in the axial line "L" direction and connects the first step part portion end face 51a with the second step part portion end face 52a. Similarly, an outer peripheral face of the fourth frame plate portion 50 is formed with a connection step part 53 which is extended in the axial line "L" direction and connects the first step part portion end face 51a with the second step part portion end face 52a. Each of the connection step parts 53 is provided with a connection step part end face 53a which is extended in the axial line "L" direction and faces the outer peripheral side.

Further, an engaging opening part 54 structured to engage with a cable side connector is provided on the lower side "L2" with respect to the second step part portion 52 of the second frame plate portion 48 and on an outer peripheral side with respect to the connection step part end face 53a. Similarly, an engaging opening part 54 structured to engage with the cable side connector is also provided on the lower side "L2" with respect to the second step part portion 52 of the fourth frame plate portion 50 and on an outer peripheral side with respect to the connection step part end face 53a. Each of the engaging opening parts 54 is a rectangular through hole and, in a case that hooks are provided in the cable side connector, the hooks are engaged with the engaging opening parts 54 from outer sides in the circumferential direction of the frame part 43.

As shown in FIG. 10B, two partition walls 55 which partially section an inside space of the frame part 43 into three spaces are provided on an inner side of the frame part 43. The partition wall 55 is extended from the closing part 44 to the lower side "L2" in parallel to the third frame plate portion 49 and the fourth frame plate portion 50. As shown in FIG. 10C, each portion of the closing part 44 which is located in each of the spaces partially sectioned by the partition walls 55 is provided with a through hole 56 penetrating in the axial line "L" direction.

As shown in FIGS. 9B and 10B, the extended part 45 is provided with two ribs 58 which are protruded to the lower side "L2" and are extended from the frame part 43 to a side of the ring-shaped part 35 of the stator core 31. Each of the ribs 58 is located on an inner peripheral side with respect to each of the partition walls 55 provided on the inner side of the frame part 43. As shown in FIG. 10C, a lower end of each of the ribs 58 is located on the upper side "L1" with respect to the second step part portion end face 52a. In the extended part 45, a through hole 59 which penetrates in the axial line "L" direction is provided in each of a portion which is located between two ribs 58, a portion located on one side with respect to one of the two ribs 58 which is located on the one side in the circumferential direction, and a portion located on the other side with respect to the other of the two ribs 58 which is located on the other side in the circumferential direction. Each through hole 59 is located on an inner peripheral side with respect to each of the through holes 56 provided in the closing part 44.

Each of the terminal pins 42 is formed by bending a metal wire whose cross-sectional shape is a quadrangular shape. As shown in FIG. 10C, the terminal pin 42 is provided with an external connection part 61, which is penetrated through the through hole 56 of the closing part 44 from the upper side "L" to the lower side "L2" and is extended to an inner side of the frame part 43, a connecting part 62 which is extended to a side of the ring-shaped part 35 of the stator core 31 (to a side of the insulator 32) along an upper face of the extended part 45 from an upper end of the external connection part 61, and a coil wire connecting part 63 which is penetrated through the through hole 59 of the extended part 45 from an end of the connecting part 62 on the side of the ring-shaped part 35 and is extended to the lower side "L2" from the upper side "L1". Each terminal pin 42 is press-fitted to the through hole 56 of the closing part 44 and the through hole 59 of the extended part 45. In this manner, the three terminal pins 42 are arranged at equal intervals in the circumferential direction.

The external connection parts 61 of the terminal pins 42 are respectively disposed in three spaces which are sectioned on an inner side of the frame part 43 by the partition walls 55. The external connection parts 61 of the respective terminal pins 42 are prevented from contacting with each other by the partition wall 55. When a cable side connector 19 is connected with the connector 20, the external connection part 61 is electrically connected with a cable 18. Further, the rib 58 is provided between two of the three coil wire connecting parts 63 adjacent to each other in the circumferential direction. As a result, the coil wire connecting parts 63 are respectively prevented from contacting with each other.

In this embodiment, the connecting part 62 is extended in a direction perpendicular to the axial line "L" between the external connection part 61 and the coil wire connecting part 63. Further, as shown in FIG. 2, when viewed in a direction perpendicular to the axial line "L", the connecting part 62 is located at a position overlapping with the stator core 31. Therefore, when the terminal pin 42 is to be supported by the connector housing 41 (when the terminal pin 42 is to be press-fitted into the through hole 56 and the through hole 59), even in a case that a force is applied to the connector housing 41 in a direction inclined to the axial line "L" and deformation may be occurred between the insulator 32 and the housing 12 which are an integrally molded product, the deformation is restrained because the connecting part 62 of the terminal pin 42 located on an outer peripheral side of the stator core 31 supports the connector housing 41.

As shown in FIG. 10C, the coil wire connecting part 63 is provided with a straight part 63a, which is extended in a straight line shape to the lower side "L2" from the connecting part 62 and reaches to the lower side "L2" with respect to the stator 11, and a bending part 63b which is bent from the straight part 63a to the stator 11 side. As shown in FIG. 9B, when viewed in the axial line "L" direction, a tip end of the bending part 63b is overlapped with the ring-shaped part 35 of the stator core 31. The coil wire connecting parts 63 of three terminal pins 42 are respectively connected with a conducting wire structuring the "U"-phase coil, a conducting wire structuring the "V"-phase coil, and a conducting wire structuring the "W"-phase coil. The bending part 63b is a coming-off prevention part which prevents the coil 33 from coming off from the terminal pin 42. In this case, the two ribs 58 located between two adjacent coil wire connecting parts 63 are, as shown in FIG. 10C, located on the upper side "L1" with respect to the bending parts 63b.

(Resin Sealing Member)

Figure 11:
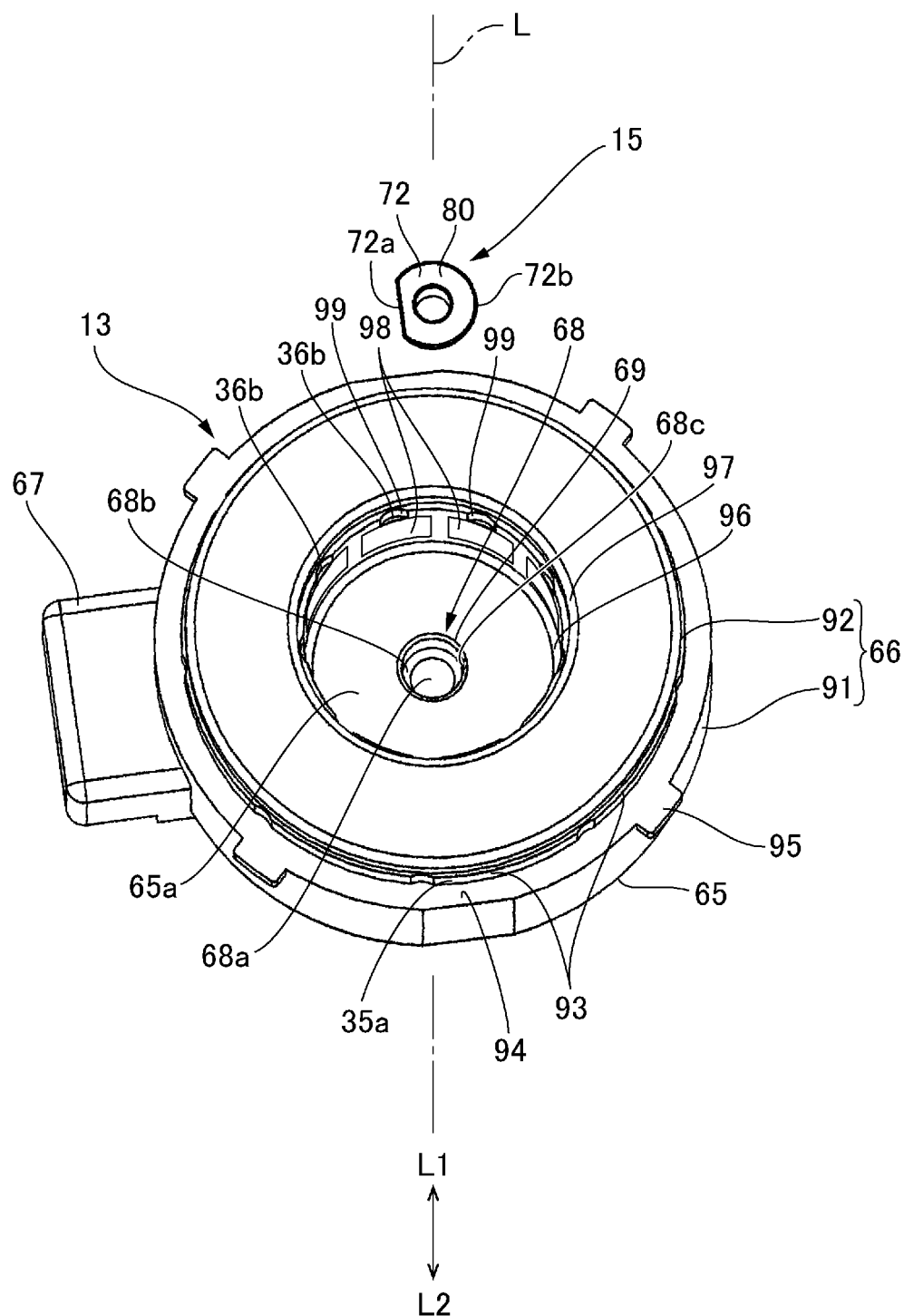
FIG. 11 is an exploded perspective view showing a resin sealing member and a first bearing member.

FIG. 11 is an exploded perspective view showing the resin sealing member 13 and the first bearing member 15. As shown in FIGS. 6 and 7, the resin sealing member 13 is provided with a sealing member bottom part 65 (opposite-to-output side sealing part) in a disk shape, which covers the coils 33, the insulators 32 and the stator core 31 from the lower side "L2", a sealing member tube part 66 which is extended to the upper side "L1" from the sealing member bottom part 65, and a connector sealing part 67 which is protruded to an outer peripheral side from the sealing member tube part 66. The resin sealing member 13 covers the coils 33 and the insulators 32. Further, the resin sealing member 13 covers the stator core 31 except an outer peripheral edge portion of an upper face of the ring-shaped part 35 and end portions on an inner peripheral side of the salient pole parts 36.

As shown in FIG. 11, the sealing member bottom part 65 is provided with a bearing member holding recessed part 68 (bearing member holding part), which holds the first bearing member 15, on an opposed face 65a facing the rotor main body 22 on an inner side with respect to the stator core 31. The bearing member holding recessed part 68 is provided with a circular bottom face 68a and a ring-shaped inner wall face 68b which is stood up from an outer peripheral edge of the bottom face 68a and extended to the upper side "L1". A groove 68c extended in the axial line "L" direction is formed in a part in the circumferential direction of the ring-shaped inner wall face 68b. Further, the sealing member bottom part 65 is provided with a chamfer part 69 in a taper shape in the opposed face 65a so as to be inclined to the lower side "L2" toward a side of the bearing member holding recessed part 68 (toward the axial line "L") in an opening edge of the bearing member holding recessed part 68.

Figure 12A:
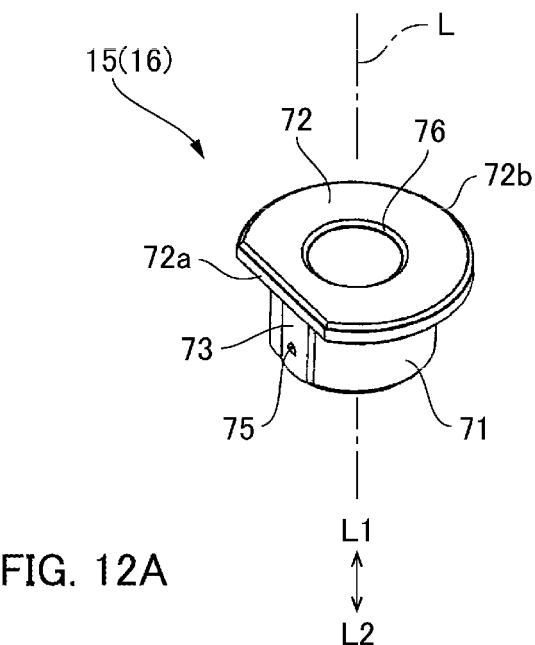
FIGS. 12A and 12B are perspective views showing a first bearing member.
Figure 12B:
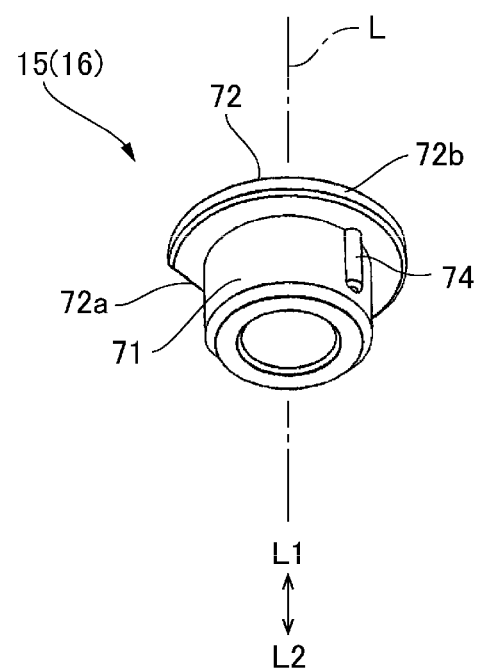

FIG. 12A is a perspective view showing the first bearing member 15 which is viewed from the upper side "L" and FIG. 12B is a perspective view showing the first bearing member 15 which is viewed from the lower side "L2". The first bearing member 15 is made of resin. As shown in FIGS. 12A and 12B, the first bearing member 15 is provided with a tube part 71 having a center hole through which the output shaft 6 is penetrated, and a flange part 72 which is enlarged to an outer peripheral side from the upper end of the tube part 71. A portion in the circumferential direction of an outer peripheral face of the tube part 71 is, as shown in FIG. 12A, formed with a groove part 73 which is extended in the axial line "L" direction with a constant width. Further, as shown in FIG. 12B, a projecting part 74 extended in the axial line "L" direction with a constant width is formed on an outer peripheral face of the tube part 71 on an opposite side to the groove part 73 with the axial line "L" interposed therebetween. The groove part 73 is formed with a gate trace 75 which was connected with a gate for resin injection when the first bearing member 15 was injection-molded. A contour of the flange part 72 is, when viewed in the axial line "L" direction, a "D"-character shape having a straight contour portion 72a extended in a straight shape and a circular arc contour portion 72b in a circular arc shape connecting both ends of the straight contour portion 72a with each other. The straight contour portion 72a is provided at the same angular position as the groove part 73 around the axial line "L". In other words, the straight contour portion 72a is located on an opposite side to the projecting part 74 with the axial line "L" interposed therebetween. An upper end face of the tube part 71 located on an inner peripheral side of the flange part 72 is formed with a tapered face 76 which is inclined to the lower side "L2" toward the center hole of the tube part 71.

The tube part 71 of the first bearing member 15 is inserted into the bearing member holding recessed part 68 in a posture that positions of the projecting part 74 and the groove 68c of the bearing member holding recessed part 68 are coincided with each other around the axial line "L". Next, as shown in FIG. 7, the flange part 72 is abutted with the opposed face 65a of the sealing member bottom part 65 from the upper side "L1" and the first bearing member 15 is fixed to the bearing member holding recessed part 68. In a state that the first bearing member 15 is fixed to the bearing member holding recessed part 68, an upper end face 80 of the flange part 72 is perpendicular to the axial line "L". The tube part 71 and the bottom face 68a of the bearing member holding recessed part 68 are separated from each other in the axial line "L" direction.

Further, in a state that the first bearing member 15 is fixed to the bearing member holding recessed part 68, an opening 77 is formed between the cut-out part 69 in a taper shape in the opposed face 65a provided at an opening edge of the bearing member holding recessed part 68 and the straight contour portion 72a of the flange part 72.

When the rotor 10 is supported by the first bearing member 15, a shaft end portion of the output shaft 6 is penetrated through the tube part 71. The tube part 71 supports the output shaft 6 (rotor 10) so as to be movable in the axial line "L" direction and rotatable around the axial line "L". The flange part 72 is capable of slidably contacting with the rotor main body 22 (first bearing plate 26) from the lower side "L2". As shown in FIG. 2, when the rotor main body 22 is slidably contacted with the flange part 72, a tip end of a protruded shaft portion of the output shaft 6 which is protruded from the tube part 71 to the lower side "L2" is separated from the bottom face 68a of the bearing member holding recessed part 68 in the axial line "L" direction.

A space between the bottom face 68a of the bearing member holding recessed part 68 and the tube part 71 of the first bearing member 15 on an inner side of the bearing member holding recessed part 68 is structured as a first lubricant storage part 81 where lubricant 82 such as grease is stored. In this embodiment, the opening 77 of the opposed face 65a and the first lubricant storage part 81 are communicated with each other through a gap space between the groove part 73 of the tube part 71 and the ring-shaped inner wall face 68b of the bearing member holding recessed part 68. In other words, the gap space between the groove part 73 of the tube part 71 and the ring-shaped inner wall face 68b of the bearing member holding recessed part 68 is a communication path 78 structured to communicate the opening 77 with the first lubricant storage part 81.

As shown in FIG. 6, an under face of the sealing member bottom part 65 is provided with a first protruded part 85 in a circular cylindrical shape (protruded part) which is protruded to the lower side "L2" from a center portion and a ring-shaped protruded part 86 which is protruded to the lower side "L2" so as to surround the first protruded part 85 on an outer peripheral side with respect to the first protruded part 85. The first protruded part 85 is formed in a circular cylinder shape and thus its tip end face is a circular end face (flat face). A ring-shaped face 87 perpendicular to the axial line "L" is provided between the first protruded part 85 and the ring-shaped protruded part 86. The ring-shaped protruded part 86 is provided with a ring-shaped tapered face 88 which is inclined to the lower side "L2" toward an outer peripheral side from the ring-shaped face 87, and a ring-shaped end face 89 which is extended from the tapered face 88 toward an outer peripheral side in a direction perpendicular to the axial line "L". An outer peripheral edge portion of the ring-shaped end face 89 where the connector 20 is located on an outer side in the radial direction is provided with a second protruded part 90. As shown in FIG. 4, a shape of the second protruded part 90 which is viewed in the axial line "L" direction is a rectangular shape which is long in the circumferential direction. Therefore, the tip end face of the second protruded part 90 is formed in a flat end face whose circumferential direction is long. The second protruded part 90 is located between the first protruded part 85 and the connector 20 in the radial direction. The second protruded part 90 is provided on an inner peripheral side with respect to the connector sealing part 67 described below and is located at a position closer to the connector 20 than the first protruded part 85.

As shown in FIG. 2, the first protruded part 85 is overlapped with the bearing member holding recessed part 68 when viewed in the axial line "L" direction. The bottom face 68a of the bearing member holding recessed part 68 is located on an inner side of the first protruded part 85. Therefore, at least a lower side portion of the first lubricant storage part 81 is located on an inner side of the first protruded part 85. The tapered face 88 of the ring-shaped protruded part 86 is provided along inclinations of lower sides "L2" of the coils 33 which are wound around the respective salient pole parts 36. The second protruded part 90 is, when viewed in the axial line "L" direction, overlapped with an outer peripheral edge portion of the ring-shaped part 35 of the stator core 31, and overlapped with the tip ends of the bending parts 63b of the coil wire connecting parts 63 of the terminal pins 42 of the connector 20. The ring-shaped end face 89 of the ring-shaped protruded part 86 is located on an upper side "L1" with respect to the circular end face 85a on the lower side "L2" of the first protruded part 85. The rectangular end face 90a (under end face) of the second protruded part 90 is a flat face and is located at the same height position as the circular end face 85a of the first protruded part 85 in the axial line "L" direction and is located on one imaginary face "S" perpendicular to the axial line "L".

The sealing member tube part 66 is, as shown in FIG. 7, provided from the lower side "L2" to the upper side "L1" with a large diameter tube portion 91 and a small diameter tube portion 92 whose outer diameter dimension is smaller than that of the large diameter tube portion 91. As shown in FIG. 2, an outer diameter of the large diameter tube portion 91 is larger than an outer diameter of the ring-shaped part 35 of the stator core 31, and an outer diameter of the small diameter tube portion 92 is smaller than the outer diameter of the ring-shaped part 35 of the stator core 31.

As shown in FIG. 7, a plurality of circular arc-shaped opening parts 93 is provided in a boundary portion between the large diameter tube portion 91 and the small diameter tube portion 92 in the sealing member tube part 66 so that outer peripheral edge portions of the ring-shaped part 35 of the stator core 31 are exposed to the upper side "L1" from the resin sealing member 13. Further, a ring-shaped end face 94 perpendicular to the axial line "L" is provided on an outer peripheral side of the circular arc-shaped opening parts 93 of the resin sealing member 13. The ring-shaped part exposed portion 35a of the stator core 31 which is exposed from the circular arc-shaped opening parts 93 and the ring-shaped end face 94 are located on the same plane perpendicular to the axial line "L". An upper end portion of the large diameter tube portion 91 is provided with four engaging projections 95 which are projected to an outer peripheral side with equal angular intervals.

An inner peripheral face of the sealing member tube part 66 is provided from the lower side "L2" to the upper side "L1" with a small diameter inner peripheral face portion 96 and a large diameter inner peripheral face portion 97 whose inner diameter dimension is larger than that of the small diameter inner peripheral face portion 96. A curvature radius of the small diameter inner peripheral face portion 96 is substantially equal to a curvature radius of the inner peripheral side end faces 36a of the salient pole parts 36. The small diameter inner peripheral face portion 96 is provided with a plurality of opening parts 98 which expose the inner peripheral side end faces 36a of the respective salient pole parts 36 of the stator core 31 to an inner peripheral side. Further, the small diameter inner peripheral face portion 96 is provided with cut-out parts 99 which expose end portions on an inner peripheral side of the respective salient pole parts 36 to the upper side "L1". Each of the cut-out parts 99 is formed in a groove shape which is extended in the axial line "L" direction from an edge of the opening part 98 to an upper end edge of the small diameter inner peripheral face portion 96. Since a plurality of the cut-out parts 99 is provided, a center portion in the circumferential direction of an upper face of an end portion on an inner peripheral side of each of the salient pole parts 36 is formed as a salient pole part exposed portion 36b which is exposed to the upper side "L1".

Inner peripheral side end faces 36a of the respective salient pole parts 36 which are exposed from the opening parts 98 are continuously connected with the small diameter inner peripheral face portion 96 without a step. An anti-rust agent is applied to the inner peripheral side end faces 36a of the respective salient pole parts 36 which are exposed from the opening parts 98. Further, the anti-rust agent is also applied to the salient pole part exposed portions 36b of the respective salient pole parts 36 which are exposed from the cut-out parts 99. The anti-rust agent is, for example, an epoxy coating.

As shown in FIG. 6, the connector sealing part 67 covers the connector 20 from the upper side "L1" and a lower end portion of the frame part 43 is exposed to the lower side "L2". In other words, in the connector 20, the step part end face 46a of the frame part 43 (first step part portion end face 51a and second step part portion end face 52a), a portion which is located on the lower side "L2" from the step part end face 46a, and the connection step part end face 53a are not covered by the connector sealing part 67 and are exposed to the outside.

Further, as shown in FIG. 4, the connector sealing part 67 is provided with an outer peripheral face portion 70 on its outer peripheral face which surrounds the frame part 43 and is respectively continuously connected with the first step part portion end face 51a, the second step part portion end face 52a, and the connection step part end face 53a without a step. The outer peripheral face portion 70 is provided with a first outer peripheral face portion 70a which is continuously connected with the first step part portion end face 51a without a step on an outer peripheral side of the first step part portion end face 51a, a second outer peripheral face portion 70b which is continuously connected with the second step part portion end face 52a without a step on an outer peripheral side of the second step part portion end face 52a, and a third outer peripheral face portion 70c which is continuously connected with the connection step part end face 53a without a step on an outer peripheral side of the connection step part end face 53a. When viewed in the axial line "L" direction, the first outer peripheral face portion 70a and the second outer peripheral face portion 70b are formed in a ring shape surrounding the frame part 43.

In this embodiment, as shown in FIG. 2, a lower end portion of the frame part 43 of the connector 20 which is exposed to the lower side "L2" from the resin sealing member 13 is not projected to the lower side from the imaginary face "S". In other words, the lower end of the connector 20 (lower end of the frame part 43) is located on the upper side "L1" with respect to the circular end face 85a of the first protruded part 85 of the sealing member bottom part 65 and the rectangular end face 90a of the second protruded part 90. Further, as shown in FIG. 4, a length dimension "D1" in the circumferential direction of the second protruded part 90, in other words, a length dimension "D1" in the circumferential direction of the rectangular end face 90a, is longer than a length dimension "D2" in the circumferential direction of the opening 43a of the frame part 43.

The resin sealing member 13 is formed of BMC (Bulk Molding Compound). In this embodiment, the stator 11 and the connector 20 are disposed in a die and resin is injected into the die and cured and, as a result, the resin sealing member 13 is formed. In other words, the resin sealing member 13 is integrally molded with the stator 11 and the connector 20 by insert molding.

(Cover Member)

Figure 13:
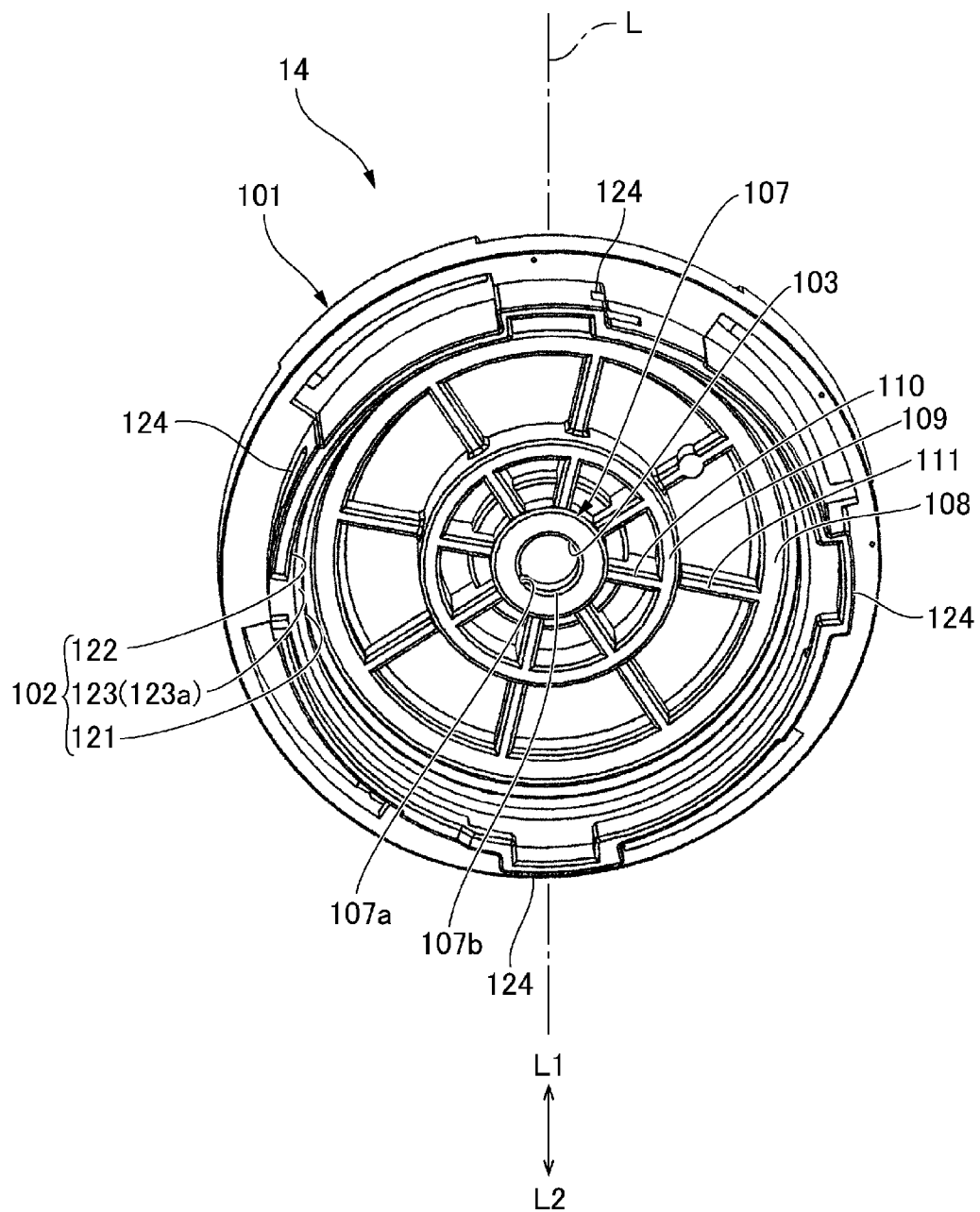
FIG. 13 is a perspective view showing a cover member which is viewed from an opposite-to-output side.

FIG. 13 is a perspective view showing the cover member 14 which is viewed from the lower side "L2". The cover member 14 is made of resin and is fixed to the upper side "L" of the resin sealing member 13. As shown in FIGS. 6 and 13, the cover member 14 is provided with a cover member ceiling part 101 in a circular plate shape and a cover member tube part 102 which is extended to the lower side "L2" from an outer peripheral side of the cover member ceiling part 101.

As shown in FIG. 13, the cover member ceiling part 101 is provided with a through hole 103 which penetrates through the center in the axial line "L" direction. When viewed in the axial line "L" direction, the through hole 103 is located at a position overlapping with the bearing member holding recessed part 68 of the resin sealing member 13. As shown in FIG. 5, a center portion of an upper face of the cover member ceiling part 101 is provided with a circular recessed part 104 surrounding the through hole 103. A sealing member 105 in a circular ring shape is inserted from the upper side "L1" and fixed to the circular recessed part 104.

As shown in FIG. 13, an under face of the cover member ceiling part 101 is provided in the center portion with a bearing member holding tube part 107 which is coaxial with the through hole 103. A center hole of the bearing member holding tube part 107 is the through hole 103. The under face of the cover member ceiling part 101 is provided with an outer side ring-shaped rib 108 along its circular outer peripheral edge. In addition, the under face of the cover member ceiling part 101 is provided with a circular inner side ring-shaped rib 109 between the bearing member holding tube part 107 and the outer side ring-shaped rib 108. Inner side ribs 110 which are radially extended from the bearing member holding tube part 107 and reach the inner side ring-shaped rib 109 are provided between the bearing member holding tube part 107 and the inner side ring-shaped rib 109. Outer side ribs 111 which are radially extended from the inner side ring-shaped rib 109 and reach the outer side ring-shaped rib 108 are provided between the inner side ring-shaped rib 109 and the outer side ring-shaped rib 108. The bearing member holding tube part 107, the outer side ring-shaped rib 108 and the inner side ring-shaped rib 109 are coaxial with each other. An under end face of the bearing member holding tube part 107, an under end face of the outer side ring-shaped rib 108, and an under end face of inner side ring-shaped rib 109 are flat faces perpendicular to the axial line "L".

As shown in FIG. 2, a protruding amount of the bearing member holding tube part 107 from the under face of the cover member ceiling part 101 is larger than a protruding amount of the inner side ring-shaped rib 109 from the under face of the cover member ceiling part 101. Under faces of the inner side ribs 110 and an under face of the inner side ring-shaped rib 109 are located on the same plane. The protruding amount of the inner side ring-shaped rib 109 from the under face of the cover member ceiling part 101 is larger than a protruding amount of the outer side ring-shaped rib 108 from the under face of the cover member ceiling part 101. The under faces of the outer side ribs 111 and the under face of the outer side ring-shaped rib 108 are located on the same plane.

As shown in FIG. 13, the bearing member holding tube part 107 is provided with a groove 107a extended in the axial line "L" direction in a part in the circumferential direction of an inner peripheral wall of the center hole (through hole 103). Further, the bearing member holding tube part 107 is provided with a cut-out part 107b in a taper shape which is inclined to the upper side "L1" toward the center hole at an opening edge of the center hole in the under end face. As shown in FIG. 6, the second bearing member 16 is held by the center hole of the bearing member holding tube part 107.

The second bearing member 16 uses the same member as the first bearing member 15 shown in FIG. 12 which is disposed with their upper and lower sides reversed. Therefore, the second bearing member 16 is provided with a tube part 71 having a center hole through which the output shaft 6 is penetrated and a flange part 72 which is enlarged from a lower end of the tube part 71 to an outer peripheral side. A part in a circumferential direction of an outer peripheral face of the tube part 71 is formed with a groove part 73 which is extended in the axial line "L" direction with a constant width. Further, a projecting part 74 which is extended in the axial line "L" direction with a constant width is formed on an outer peripheral face of the tube part 71 on an opposite side to the groove part 73 with the axial line "L" interposed therebetween. The groove part 73 is formed with a gate trace 75 which was connected with a gate for resin injection when the second bearing member 16 was injection-molded. A contour of the flange part 72 is, when viewed in the axial line "L" direction, a "D"-character shape having a straight contour portion 72a extended in a straight shape and a circular arc contour portion 72b in a circular arc shape connecting both ends of the straight contour portion 72a with each other. The straight contour portion 72a is provided at the same angular position as the groove part 73 around the axial line "L". In other words, the straight contour portion 72a is located on an opposite side to the projecting part 74 with the axial line "L" interposed therebetween. A lower end face of the tube part 71 located on an inner peripheral side of the flange part 72 is formed with a tapered face 76 which is inclined to the upper side "L" toward the center hole of the tube part 71.

The tube part 71 of the second bearing member 16 is inserted into the bearing member holding tube part 107 in a posture that positions of the projecting part 74 of the tube part 71 and the groove 107a of the bearing member holding tube part 107 are coincided with each other around the axial line "L". Next, as shown in FIG. 6, the flange part 72 is abutted with the bearing member holding tube part 107 from the lower side "L2" and the second bearing member 16 is fixed to the bearing member holding tube part 107. In a state that the second bearing member 16 is fixed to the bearing member holding tube part 107, a lower end face of the flange part 72 is perpendicular to the axial line "L". Further, the tube part 71 and the sealing member 105 face each other with a space therebetween in the axial line "L" direction. In addition, in the under end face of the bearing member holding tube part 107, an opening 115 (gap space) is formed between the straight contour portion 72a of the flange part 72 and the cut-out part 107b of the bearing member holding tube part 107.

The second bearing member 16 supports the rotor 10 in a state that the output shaft 6 is penetrated through the rotor 10. The tube part 71 of the second bearing member 16 supports the output shaft 6 (rotor 10) movable in the axial line "L" direction and rotatably supports the output shaft 6 around the axial line "L". The flange part 72 is capable of slidably contacting with the rotor main body 22 (second bearing plate 27) from the upper side "L". Therefore, when the rotor 10 is rotated, the rotor 10 is moved in the axial line "L" direction between a lower position (see FIG. 2) where the rotor main body 22 is slidably contacted with the flange part 72 of the first bearing member 15 and an upper position where the rotor main body 22 is slidably contacted with the flange part 72 of the second bearing member 16.

A gap space between the second bearing member 16 and the sealing member 105 (through hole portion which is located on the upper side "L1" and the output side with respect to the second bearing member 16) on an inner side of the through hole 103 is a second lubricant storage part 118 where lubricant 119 such as grease is stored. As shown in FIG. 2, the opening 115 of the under end face of the bearing member holding tube part 107 and the second lubricant storage part 118 is communicated with each other through a gap space between the groove part 73 of the tube part 71 and an inner wall face of the center hole of the bearing member holding tube part 107. In other words, the gap space between the groove part 73 of the tube part 71 and the inner wall face of the center hole of the bearing member holding tube part 107 is a communication path 116 structured to communicate the opening 115 with the second lubricant storage part 118.

The cover member tube part 102 is, as shown in FIGS. 6 and 13, extended to the lower side "L2" from an outer peripheral side with respect to the outer side ring-shaped rib 108. The cover member tube part 102 is, as shown in FIG. 2, provided with an upper side ring-shaped tube portion 121, which is overlapped and covers the small diameter tube portion 92 of the resin sealing member 13 from an outer peripheral side, and a lower side ring-shaped tube portion 122 which is located on an outer peripheral side of the large diameter tube portion 91 on a lower side with respect to the upper side ring-shaped tube portion 121. A ring-shaped step part 123 is provided between the upper side ring-shaped tube portion 121 and the lower side ring-shaped tube portion 122 in an inner peripheral face of the cover member tube part 102. The ring-shaped step part 123 is provided with a ring-shaped face 123a which faces the lower side "L2". The ring-shaped face 123a is a flat face perpendicular to the axial line "L". As shown in FIGS. 6 and 13, the lower side ring-shaped tube portion 122 is provided with an engaged part 124 which is engaged with the engaging projection 95 of the resin sealing member 13 at four positions in the circumferential direction.

The resin sealing member 13 is covered with the cover member 14 from the upper side "L1" in a state that the rotor 10 is disposed on an inner side of the resin sealing member 13 and the rotor 10 is supported by the first bearing member 15. When the resin sealing member 13 is to be covered with the cover member 14, an adhesive is applied to an outer peripheral edge portion of an upper face of the resin sealing member 13.

When the resin sealing member 13 is to be covered with the cover member 14, as shown in FIG. 2, the output shaft 6 is penetrated through the tube part 71 of the second bearing member 16 which is held by the cover member 14, and the lower end portion of the inner side ring-shaped rib 109 is fitted into an inner peripheral side of the sealing member tube part 66 of the resin sealing member 13. As a result, the cover member 14 and the resin sealing member 13 are positioned each other in the radial direction, and the axial line "L" of the output shaft 6 and the center axial line of the stator 11 are coincided with each other. Further, the ring-shaped face 123a of the ring-shaped step part 123 of the cover member tube part 102 is abutted with the ring-shaped end face 94 between the large diameter tube portion 91 and the small diameter tube portion 92 of the resin sealing member 13. As a result, the cover member 14 and the resin sealing member 13 are positioned each other in the axial line "L" direction. After that, the cover member 14 and the resin sealing member 13 are relatively turned in the circumferential direction and, as shown in FIG. 1, the engaging projections 95 of the resin sealing member 13 and the engaged parts 124 of the cover member 14 are engaged with each other. In this manner, the cover member ceiling part 101 covers the rotor 10 and the resin sealing member 13 from the upper side "L1" in a state that the output shaft 6 is penetrated through the cover member ceiling part 101 in the axial line "L" direction. Further, the output shaft 6 is penetrated through the sealing member 105 which is disposed in the circular recessed part 104 of the cover member ceiling part 101. The sealing member 105 seals between the output shaft 6 and the cover member 14. In addition, the upper side ring-shaped tube portion 121 of the cover member tube part 102 surrounds the small diameter tube portion 92 of the resin sealing member 13 from the outer peripheral side.

When the cover member 14 is fixed to the resin sealing member 13, the rotor 10 is supported by the first bearing member 15 and the second bearing member 16 in a state that the rotor main body 22 is movable in the axial line "L" direction between the lower position where the rotor main body 22 is slidably contacted with the upper end face 80 of the flange part 72 of the first bearing member 15 and the upper position where the rotor main body 22 is slidably contacted with the under end face of the flange part 72 of the second bearing member 16, and in a state that the rotor main body 22 is rotatable around the axial line "L".

An impeller 5 is connected with an upper end portion of the output shaft 6. After that, the cover member 14 is covered with the case body 3 from the upper side "L1". As a result, a space sectioned between the cover member 14 and the case body 3 is structured as the pump chamber 4, and the impeller 5 is disposed in the pump chamber 4.

(Operations and Effects)

The motor 2 in this embodiment includes the first protruded part 85 and the second protruded part 90 which are protruded to the lower side "L2" in the sealing member bottom part 65 disposed on the lower side "L2" with respect to the rotor 10 and the stator 11 in the resin sealing member 13 structuring the housing 12. Further, the circular end face 85a (flat face) which is the under end face of the first protruded part 85 and the rectangular end face 90a (flat face) which is the under end face of the second protruded part 90 are located on one imaginary face "S" which is perpendicular to the axial line "L". On the other hand, the lower end of the frame part 43 of the connector 20 which is exposed from the resin sealing member 13 is located on the upper side "L" with respect to the imaginary face "S". Therefore, in a case that the pump device 1 (motor 2) is placed on a placing surface of a workbench in a posture that its opposite-to-output side is disposed on the lower side "L2", the pump device 1 (motor 2) stands on its own in a posture that the circular end face 85a of the first protruded part 85 and the rectangular end face 90a of the second protruded part 90 are abutted with the placing surface of the workbench. Further, in this posture, the lower end of the frame part 43 exposed from the resin sealing member 13 is not contacted with the placing surface. Therefore, the lower end of the frame part 43 is prevented from being damaged. Further, the second protruded part 90 is provided at a position close to the frame part 43 of the connector 20 and thus the lower end of the frame part 43 can be surely prevented from being contacted with the placing surface.

In addition, the pump device 1 (motor 2) stands on its own in a predetermined posture with the circular end face 85a of the first protruded part 85 and the rectangular end face 90a of the second protruded part 90 provided in the resin sealing member 13 as a setting face. Therefore, for example, in comparison with a case that the entire surface on the lower side "L2" of the sealing member bottom part 65 of the resin sealing member 13 is located on the lower side "L2" with respect to the lower end of the frame part 43 of the connector 20, an amount of resin for forming the resin sealing member 13 can be reduced.

Further, the first protruded part 85 is, when viewed in the axial line "L" direction, located at the position overlapping with the bearing member holding recessed part 68 where the first bearing member 15 is held. The temperature of the first bearing member 15 may rise due to heat generated by slidably contacting with the rotating rotor 10. However, when the first protruded part 85 is provided at the position overlapping with the bearing member holding recessed part 68, a surface area of a portion close to the bearing member holding recessed part 68 in the sealing member bottom part 65 is increased by forming the first protruded part 85. Therefore, heat generated by slidably contacting of the bearing member with the rotor 10 can be radiated to the outside through the sealing member bottom part 65.

In addition, in this embodiment, the second protruded part 90 is, when viewed in the axial line "L" direction, provided at the position overlapping with the bending part 63b of the terminal pin 42 of the connector 20. As a result, the sealing member bottom part 65 is provided with a portion whose thickness is larger than other portions on the lower side "L2" with respect to the bending parts 63b and thus the coil wire connecting parts 63 of the terminal pins 42 can be protected.

Further, in this embodiment, the length dimension "D1" in the circumferential direction of the second protruded part 90 is longer than the length dimension "D2" in the circumferential direction of the opening 43a of the frame part 43. Therefore, in a case that the pump device 1 (motor 2) is placed on a placing surface of a workbench in a posture that the sealing member bottom part 65 is disposed on the lower side "L2", the end on the lower side "L2" of the frame part 43 can be surely prevented from contacting with the placing surface of the workbench.

In addition, in this embodiment, a lower end portion of the frame part 43 of the connector 20 with which a cable side connector 19 of an external cable 18 is to be connected is exposed to the lower side "L2" from the resin sealing member 13. In other words, an exposed portion of the frame part 43 from the resin sealing member 13 is provided at a separated position from the impeller 5. Therefore, the frame part 43 of the connector 20 with which a cable side connector 19 of an external cable 18 is to be connected can be protected from water or the like pumped by the impeller 5.

In accordance with an embodiment of the present invention, the resin sealing member 13 which structures the housing 12 may be further provided with a protruded part whose under end face is located on the imaginary face "S" in addition to the first protruded part 85 and the second protruded part 90.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a rotor;
   a stator comprising a plurality of coils which are arranged in a ring shape and surround the rotor;
   a connector which is located on an outer peripheral side with respect to the plurality of the coils and is capable of being detachably connected with a cable side connector of an external cable for supplying electrical power to the plurality of the coils; and
   a resin sealing member which covers the coils;
   wherein when one side in a direction of a rotation center line of the rotor is referred to as an output side, and an other side is referred to as an opposite-to-output side, the resin sealing member comprises an opposite-to-output side sealing part which is disposed on the opposite-to-output side with respect to the rotor and the stator, and a connector sealing part which covers the connector from the output side;
   wherein the connector comprises a frame part into which the cable side connector is to be inserted from the opposite-to-output side toward the output side;
   wherein an end portion on the opposite-to-output side of the frame part is exposed to the opposite-to-output side from the resin sealing member;
   wherein the opposite-to-output side sealing part comprises a first protruded part and a second protruded part which are protruded to the opposite-to-output side;
   wherein a tip end face of the first protruded part and a tip end face of the second protruded part are located on one imaginary face intersecting the rotation center line;
   wherein a tip end on the opposite-to-output side of the frame part is located on the output side with respect to the imaginary face; and
   wherein the second protruded part is provided at a position closer to the frame part between the first protruded part and the frame part.

2. The motor according to claim 1, further comprising a bearing member which rotatably supports the rotor,
   wherein the opposite-to-output side sealing part comprises a bearing member holding part which holds the bearing member, and
   wherein the first protruded part is provided at a position overlapping with the bearing member holding part when viewed in the direction of the rotation center line.

3. The motor according to claim 2, wherein
   the connector comprises a plurality of terminal pins which are electrically connected with the plurality of the coils,
   each of the terminal pins comprises:
      an external connection part which is extended on an inner side of the frame part along the frame part;
      a connecting part which is extended from an end on the output side of the external connection part to a side of the stator; and
      a coil wire connecting part which is extended from an end of the connecting part on the side of the stator between the frame part and the stator,
   the coil wire connecting part comprises:
      a straight part which is extended in a straight shape from the connecting part to the opposite-to-output side and is reached to the opposite-to-output side with respect to the stator; and
      a bending part which is bent from the straight part to the side of the stator, and
   the second protruded part is provided at a position overlapping with a tip end of the bending part when viewed in the direction of the rotation center line.

4. The motor according to claim 3, wherein
   the stator comprises a stator core having a ring-shaped part and a plurality of salient pole parts which are protruded from the ring-shaped part to an inner side in a radial direction,
   each of the coils is wound around each of the salient pole parts through an insulator,
   the connector comprises a connector housing having the frame part,
   the insulator and the connector housing are structured of one integrally molded product made of resin,
   the plurality of the terminal pins is supported by the connector housing, and
   the connecting part is located at a position overlapping with the stator core when viewed in a direction perpendicular to the rotation center line.

5. The motor according to claim 4, wherein a length dimension in a circumferential direction of the second protruded part is longer than a length dimension in the circumferential direction of an opening of the frame part.

6. The motor according to claim 2, wherein
   the first protruded part is protruded from a center portion of the opposite-to-output side sealing part and is a protruded part in a circular cylinder shape which is structured with the bearing member holding part in its inside, and
   a tip end face of the first protruded part is a circular end face which is formed on the opposite-to-output side of the protruded part in the circular cylinder shape.

7. The motor according to claim 6, wherein
   the opposite-to-output side sealing part comprises a ring-shaped protruded part which is protruded to the opposite-to-output side on an outer peripheral side of the first protruded part so as to surround the first protruded part, and
   a flat end face whose circumferential direction is long is formed as the tip end face of the second protruded part on an inner peripheral side with respect to the connector sealing part in an outer peripheral edge portion of the ring-shaped protruded part.

8. The motor according to claim 1, wherein
   the connector comprises a plurality of terminal pins which are electrically connected with the plurality of the coils,
   each of the terminal pins comprises:
      an external connection part which is extended on an inner side of the frame part along the frame part;
      a connecting part which is extended from an end on the output side of the external connection part to a side of the stator; and
      a coil wire connecting part which is extended from an end of the connecting part on the side of the stator between the frame part and the stator, the coil wire connecting part comprises:
- a straight part which is extended in a straight shape from the connecting part to the opposite-to-output side and is reached to the opposite-to-output side with respect to the stator; and
- a bending part which is bent from the straight part to the side of the stator, and the second protruded part is provided at a position overlapping with a tip end of the bending part when viewed in the direction of the rotation center line.

9. The motor according to claim 8, wherein
the stator comprises a stator core having a ring-shaped part and a plurality of salient pole parts which are protruded from the ring-shaped part to an inner side in a radial direction,
each of the coils is wound around each of the salient pole parts through an insulator,
the connector comprises a connector housing having the frame part,
the insulator and the connector housing are structured of one integrally molded product made of resin,
the plurality of the terminal pins is supported by the connector housing, and
the connecting part is located at a position overlapping with the stator core when viewed in a direction perpendicular to the rotation center line.

10. The motor according to claim 9, further comprising a bearing member which rotatably supports the rotor,
wherein the opposite-to-output side sealing part comprises a bearing member holding part which holds the bearing member, and
wherein the first protruded part is provided at a position overlapping with the bearing member holding part when viewed in the direction of the rotation center line.

11. The motor according to claim 1, wherein a length dimension in a circumferential direction of the second protruded part is longer than a length dimension in the circumferential direction of an opening of the frame part.

12. The motor according to claim 11, wherein
the opposite-to-output side sealing part comprises a ring-shaped protruded part which is protruded to the opposite-to-output side on an outer peripheral side of the first protruded part so as to surround the first protruded part,
a flat end face whose circumferential direction is long is formed as the tip end face of the second protruded part on an inner peripheral side with respect to the connector sealing part in an outer peripheral edge portion of the ring-shaped protruded part, and
a length dimension in the circumferential direction of the flat end face is set longer than a length dimension in the circumferential direction of the opening of the frame part.

13. The motor according to claim 12, wherein
the connector sealing part is provided so as to surround an outer peripheral face of the frame part and expose a portion on the opposite-to-output side of the frame part,
the frame part is provided with a rectangular outline shape whose longitudinal direction is directed in the circumferential direction when viewed in the direction of the rotation center line, and
the flat end face of the second protruded part is a rectangular end face whose longitudinal direction is directed in the circumferential direction when viewed in the direction of the rotation center line.

14. A pump device comprising:
the motor defined in claim 1;
a pump chamber;
an impeller which is disposed in an inside of the pump chamber;
wherein the rotor comprises an output shaft which is coaxial with the rotation center line;
wherein the output shaft is extended into the inside of the pump chamber from an outer side of the pump chamber; and
wherein the impeller is connected with an end portion on the output side of the output shaft.

15. The pump device according to claim 14, wherein
the motor comprises a bearing member which rotatably supports the output shaft of the rotor,
the opposite-to-output side sealing part comprises a bearing member holding part which holds the bearing member, and
the first protruded part is provided at a position overlapping with the bearing member holding part when viewed in the direction of the rotation center line.

16. The pump device according to claim 15, wherein
the first protruded part is protruded from a center portion of the opposite-to-output side sealing part and is a protruded part in a circular cylinder shape which is structured with the bearing member holding part in its inside, and
a tip end face of the first protruded part is a circular end face which is formed on the opposite-to-output side of the protruded part in the circular cylinder shape.

17. The pump device according to claim 16, wherein
the opposite-to-output side sealing part comprises a ring-shaped protruded part which is protruded to the opposite-to-output side on an outer peripheral side of the first protruded part so as to surround the first protruded part, and
a flat end face whose circumferential direction is long is formed as the tip end face of the second protruded part on an inner peripheral side with respect to the connector sealing part in an outer peripheral edge portion of the ring-shaped protruded part.

18. The pump device according to claim 14, wherein
the connector comprises a plurality of terminal pins which are electrically connected with the plurality of the coils,
each of the terminal pins comprises:
- an external connection part which is extended on an inner side of the frame part along the frame part;
- a connecting part which is extended from an end on the output side of the external connection part to a side of the stator; and
- a coil wire connecting part which is extended from an end of the connecting part on the side of the stator between the frame part and the stator, the coil wire connecting part comprises:
- a straight part which is extended in a straight shape from the connecting part to the opposite-to-output side and is reached to the opposite-to-output side with respect to the stator; and
- a bending part which is bent from the straight part to the side of the stator, and the second protruded part is provided at a position overlapping with a tip end of the bending part when viewed in the direction of the rotation center line.

19. The pump device according to claim 18, wherein
the stator comprises a stator core having a ring-shaped part and a plurality of salient pole parts which are protruded from the ring-shaped part to an inner side in a radial direction, each of the coils is wound around each of the salient pole parts through an insulator, the connector comprises a connector housing having the frame part, the insulator and the connector housing are structured of one integrally molded product made of resin, the plurality of the terminal pins is supported by the connector housing, and the connecting part is located at a position overlapping with the stator core when viewed in a direction perpendicular to the rotation center line.

20. The pump device according to claim 14, wherein a length dimension in a circumferential direction of the second protruded part is longer than a length dimension in the circumferential direction of an opening of the frame part.

21. The pump device according to claim 20, wherein the opposite-to-output side sealing part comprises a ring-shaped protruded part which is protruded to the opposite-to-output side on an outer peripheral side of the first protruded part so as to surround the first protruded part, a flat end face whose circumferential direction is long is formed as the tip end face of the second protruded part on an inner peripheral side with respect to the connector sealing part in an outer peripheral edge portion of the ring-shaped protruded part, and a length dimension in the circumferential direction of the flat end face is set longer than a length dimension in the circumferential direction of an opening of the frame part.

22. The pump device according to claim 21, wherein the connector sealing part is provided so as to surround an outer peripheral face of the frame part and expose a portion on the opposite-to-output side of the frame part, the frame part is provided with a rectangular outline shape whose longitudinal direction is directed in the circumferential direction when viewed in the direction of the rotation center line, and the flat end face of the second protruded part is a rectangular end face whose longitudinal direction is directed in the circumferential direction when viewed in the direction of the rotation center line.

* * * * *